(12) United States Patent
Nagatomi et al.

(10) Patent No.: US 11,970,117 B2
(45) Date of Patent: Apr. 30, 2024

(54) DISPLAY SYSTEM

(71) Applicant: Panasonic Intellectual Property Management Co., Ltd., Osaka (JP)

(72) Inventors: Kenji Nagatomi, Osaka (JP); Norihiro Imamura, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/222,803

(22) Filed: Jul. 17, 2023

(65) Prior Publication Data

US 2024/0075881 A1  Mar. 7, 2024

(30) Foreign Application Priority Data

Sep. 6, 2022 (JP) .................... 2022-141246
Mar. 3, 2023 (JP) .................... 2023-032534

(51) Int. Cl.
| | | |
|---|---|---|
| *B60R 1/28* | (2022.01) | |
| *G02B 27/00* | (2006.01) | |
| *G02B 27/28* | (2006.01) | |
| *G06F 3/01* | (2006.01) | |
| *G06T 5/80* | (2024.01) | |
| *G06T 7/70* | (2017.01) | |

(52) U.S. Cl.
CPC ............ *B60R 1/28* (2022.01); *G02B 27/0068* (2013.01); *G02B 27/0093* (2013.01); *G02B 27/281* (2013.01); *G06F 3/012* (2013.01); *G06F 3/013* (2013.01); *G06T 5/80* (2024.01); *G06T 7/70* (2017.01); *B60R 2300/207* (2013.01); *G02B 2207/123* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 9,429,757 B1 * | 8/2016 | Peeri .................. | G02B 27/0101 |
| 10,017,114 B2 | 7/2018 | Bongwald | |
| 10,682,958 B2 | 6/2020 | Oba | |
| 2019/0162960 A1 * | 5/2019 | Harada .............. | G02B 27/0101 |
| 2022/0121028 A1 * | 4/2022 | Smeeton ............ | G02B 27/0103 |

* cited by examiner

*Primary Examiner* — Stephen T. Reed
(74) *Attorney, Agent, or Firm* — Greenblum & Bernstein, P.L.C.

(57) ABSTRACT

A display system includes: an outputter that is provided behind a windshield of a conveyance in a front-back direction of the conveyance and includes an output surface from which image light is outputted toward the windshield; a reflector that is provided between the windshield and the output surface and includes a reflecting surface at which the image light outputted from the output surface is reflected; and optics that includes a polarizing plate and is provided on the windshield or between the windshield and the reflector, the polarizing plate absorbing or reflecting the image light outputted from the output surface and not reflected at the reflecting surface, and allowing outside light that is light outside of the conveyance to pass through the polarizing plate.

20 Claims, 23 Drawing Sheets

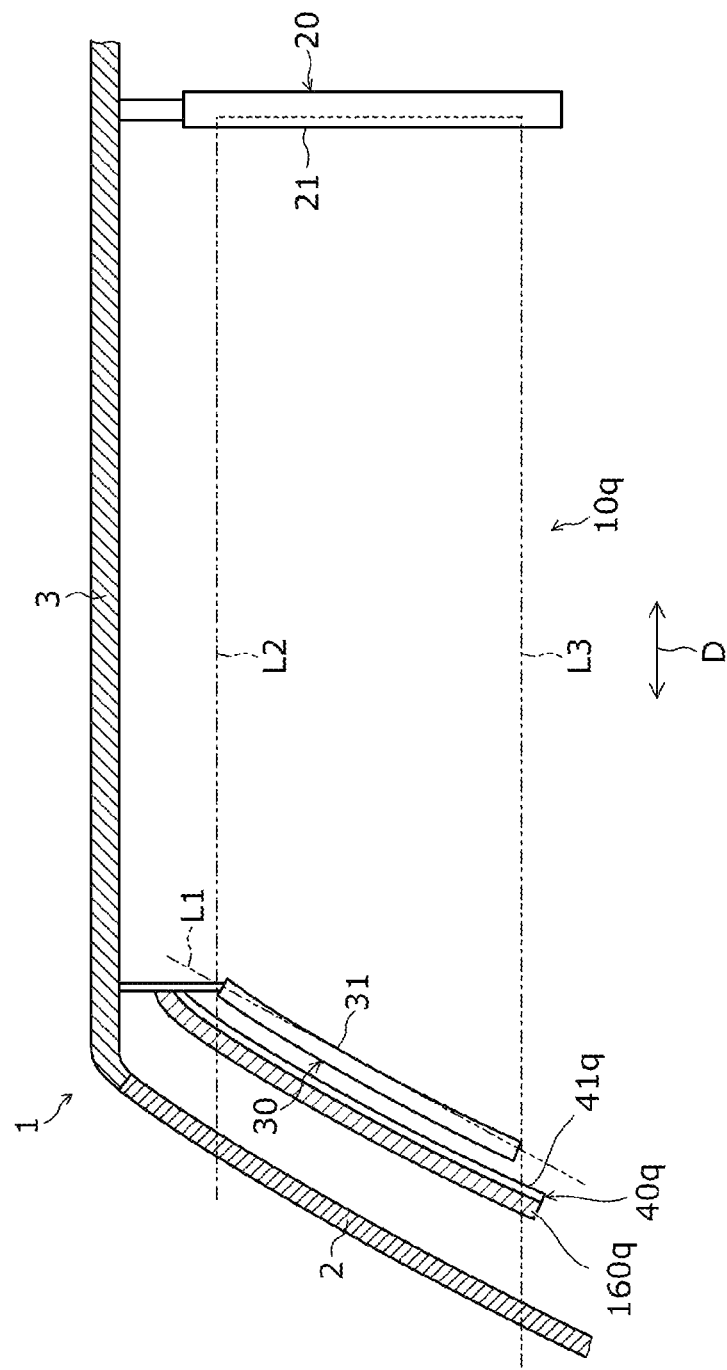

DISPLAY SYSTEM

CROSS REFERENCE TO RELATED APPLICATIONS

The present application is based on and claims priority of Japanese Patent Application No. 2022-141246 filed on Sep. 6, 2022, and Japanese Patent Application No. 2023-032534 filed on Mar. 3, 2023.

FIELD

The present disclosure relates to a display system.

BACKGROUND

There is known a display system that displays an image. Examples of such display systems include a system disclosed in Patent Literature (PTL) 1 including a display unit and a mirror unit that reflects image light outputted from the display unit.

CITATION LIST

Patent Literature

PTL 1: U.S. patent Ser. No. 10/682,958

SUMMARY

However, the system according to PTL 1 can be improved upon.

In view of this, the present disclosure provides a display system capable of improving upon the above related art.

The display system according to an aspect of the present disclosure includes an outputter that is provided behind a windshield of a conveyance in a front-back direction of the conveyance and includes an output surface from which image light is outputted toward the windshield; a reflector that is provided between the windshield and the output surface and includes a reflecting surface at which the image light outputted from the output surface is reflected; and optics that includes a polarizing plate and is provided on the windshield or between the windshield and the reflector, the polarizing plate absorbing or reflecting the image light outputted from the output surface and not reflected at the reflecting surface, and allowing outside light that is light outside of the conveyance to pass through the polarizing plate.

A display system according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 23 is a schematic diagram of a display system according to Embodiment 18.

DESCRIPTION OF EMBODIMENTS

Figure 1:
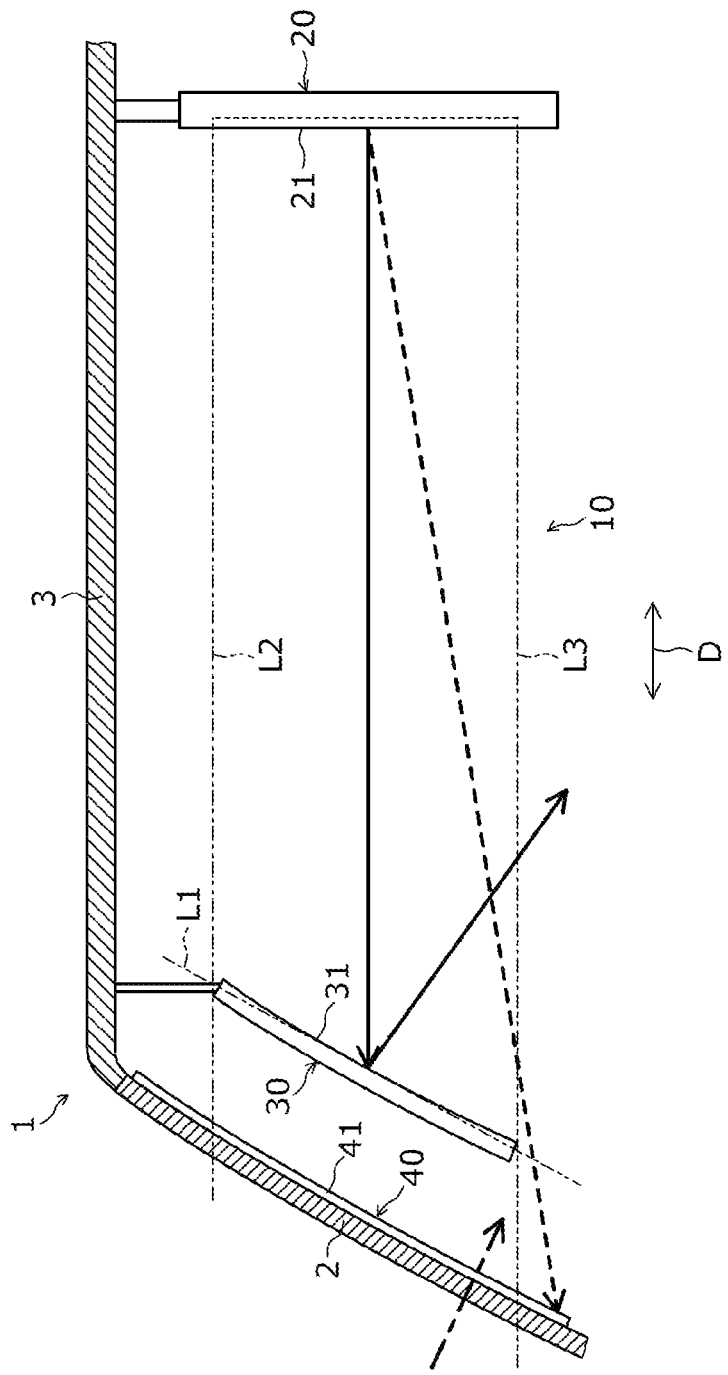
FIG. 1 is a schematic diagram of a display system according to Embodiment 1.

The above related art can be improved upon in that: when the display unit is provided behind the windshield of the conveyance and the mirror unit is provided between the windshield and the display unit to cause image light outputted from the display unit to be reflected at the mirror unit, part of the image light outputted from the display unit and not reflected at the mirror unit is outputted to outside of the conveyance; and when the size of the mirror unit is increased to prevent the image light outputted from the display unit from being outputted to outside of the conveyance, the visibility is obstructed.

In view of the above, the present disclosure aims to provide a display system capable of preventing image light from being outputted to outside of a conveyance, while preventing the visibility from being obstructed.

The display system according to an aspect of the present disclosure includes: an outputter that is provided behind a windshield of a conveyance in a front-back direction of the conveyance and includes an output surface from which image light is outputted toward the windshield; a reflector that is provided between the windshield and the output surface and includes a reflecting surface at which the image light outputted from the output surface is reflected; and optics that includes a polarizing plate and is provided on the windshield or between the windshield and the reflector, the polarizing plate absorbing or reflecting the image light outputted from the output surface and not reflected at the reflecting surface, and allowing outside light that is light outside of the conveyance to pass through the polarizing plate.

With this, it is possible for the polarizing plate to absorb or reflect the image light outputted from the output surface and not reflected at the reflecting surface. This prevents the image light from being outputted to outside of the conveyance. The polarizing plate is also capable of allowing outside light, which is light outside of the conveyance, to pass through the polarizing plate. This prevents the visibility from being obstructed. As described above, it is possible to prevent the image light from being outputted to outside of the conveyance, while preventing the visibility from being obstructed.

Also, in the display system according to an aspect of the present disclosure, the polarizing plate may be provided at least one of: above a line that passes through an upper edge portion of the output surface and an upper edge portion of the reflector in an up-down direction of the conveyance; or below a line that passes through a lower edge portion of the output surface and a lower edge portion of the reflector in the up-down direction of the conveyance.

With this, it is possible to prevent, in a more reliable manner, the image light that is outputted from the output surface and not reflected at the reflecting surface and that travels above the line passing through the upper edge portion of the output surface and the upper edge portion of the reflector in the up-down direction of the conveyance from being outputted to outside of the conveyance. It is also possible to prevent, in a more reliable manner, the image light outputted from the output surface and not reflected at the reflecting surface and that travels below the line passing through the lower edge portion of the output surface and the lower edge portion of the reflector in the up-down direction of the conveyance from being outputted to outside of the conveyance. As described above, it is possible to prevent, in a more reliable manner, the image light from being outputted to outside of the conveyance, while preventing the visibility from being obstructed.

Also, in the display system according to an aspect of the present disclosure, the optics may include a λ/4 plate that is provided on a side of the polarizing plate that is opposite to a side facing the reflector.

With this, it is possible to convert outside light that is absorbed or reflected by the polarizing plate in the absence of the λ/4 plate into light that is transmissive through the polarizing plate. This enables a larger amount of outside light to enter inside of the conveyance. This thus prevents the image light from being outputted to outside of the conveyance, while further preventing the visibility from being obstructed.

Also, the display system according to an aspect of the present disclosure may include a correction lens that is provided between the output surface and the reflecting surface, allows the image light outputted from the output surface to pass through the correction lens toward the reflecting surface, and corrects an image formed of the image light reflected at the reflecting surface.

With this, it is possible for the correction lens to correct the image formed of the image light reflected at the reflecting surface, even in the case where, for example, the position of the eyes of a person who views such image has changed.

Also, the display system according to an aspect of the present disclosure may include an imager that images a person riding in the conveyance; a correction lens that is provided between the output surface and the reflecting surface and allows the image light outputted from the output surface to pass through the correction lens toward the reflecting surface, the correction lens being a correction lens for correcting an image formed of the image light reflected at the reflecting surface; and a corrector that corrects the image formed of the image light reflected at the reflecting surface by controlling a position of the correction lens, based on at least one of a position of a head of the person or a position of an eye of the person, the person having been imaged by the imager.

With this, it is easy to correct the image formed of the image light reflected at the reflecting surface by controlling the position of the correction lens, on the basis of at least one of the position of the head or the position of the eyes of a person who views such image, even when, for example, the position of the eyes of such person has changed.

Also, the display system according to an aspect of the present disclosure may include an imager that images a person riding in the conveyance; and a corrector that corrects an image formed of the image light reflected at the reflecting surface by correcting an image signal that is a base of the image signal, based on at least one of a position of a head of the person or a position of an eye of the person, the person having been imaged by the imager.

With this, it is easy to correct the image formed of the image light reflected at the reflecting surface by correcting the image signal that is the base of the image light, on the basis of at least one of the position of the head or the position of the eyes of a person who views such image, even when, for example, the position of the eyes of such person has changed.

Also, in the display system according to an aspect of the present disclosure, in a left-right direction of the conveyance, the output surface and the reflecting surface may be provided on a driver's seat side of the conveyance relative to a center of the conveyance.

With this, it is possible to decrease the difference between the light paths in the left-right direction when viewed from a person seated in the driver's seat. This prevents and reduces the occurrence of a distortion in the image formed of the image light reflected at the reflecting surface.

Also, in the display system according to an aspect of the present disclosure, when viewed from an up-down direction of the conveyance, the output surface and the reflecting surface may be provided in an orientation in which a line that passes through a center of the output surface and a center of the reflecting surface passes through a head of a person riding in the conveyance.

With this, it is possible to decrease the difference between the light paths in the left-right direction when viewed from a person riding in the conveyance. This prevents and reduces the occurrence of a distortion in the image formed of the image light reflected at the reflecting surface.

Also, in the display system according to an aspect of the present disclosure, the polarizing plate may not be provided in at least part of a portion of the windshield, the portion being a portion that overlaps the reflector in a direction in which the output surface and the reflecting surface are disposed in line.

With this, a portion of the windshield that is a portion overlapping the reflector in the direction in which the output surface and the reflecting surface are disposed in line is less exposed to the image light outputted from the output surface.

Also, the polarizing plate is not provided in at least part of such portion that is less exposed to the image light outputted from the output surface as described above. This prevents the visibility from being obstructed and the image light from being outputted to outside of the conveyance, while preventing and reducing an increase in the cost relating to the polarizing plate.

Also, the display system according to an aspect of the present disclosure may include a louver film that is provided between the output surface and the reflecting surface, allows the image light outputted in a direction from the output surface to the reflecting surface to pass through the louver film, and blocks the image light that is outputted more downward than the direction from the output surface to the reflecting surface in an up-down direction of the conveyance.

With this, it is possible for the louver film to block the image light that is outputted more downward in the up-down direction of the conveyance than the direction from the output surface to the reflecting surface. This prevents the image light from being outputted to outside of the conveyance, while further preventing the visibility from being obstructed.

Also, the display system according to an aspect of the present disclosure may include a blocker that blocks the image light that is outputted more downward than a direction from the output surface to the reflecting surface in an up-down direction of the conveyance.

With this, it is possible for the blocker to block the image light that is outputted more downward in the up-down direction of the conveyance than the direction from the output surface to the reflecting surface. This prevents the image light from being outputted to outside of the conveyance, while further preventing the visibility from being obstructed.

Also, the display system according to an aspect of the present disclosure may include a $\lambda/4$ plate that is provided between the output surface and the reflecting surface. Here, the optics may include a $\lambda/4$ plate that is provided on a side of the polarizing plate that is a side facing the reflector.

With this, it is possible to convert the outside light into circular polarized light and cause such circular polarized light to be outputted to inside of the conveyance. This prevents the image light from being outputted to outside of the conveyance, while further preventing the visibility from being obstructed.

Also, in the display system according to an aspect of the present disclosure, the polarizing plate may be a reflective polarizing plate that reflects the image light outputted from the output surface and not reflected at the reflecting surface.

With this, it is possible to prevent the polarizing plate from producing heat as a result of absorbing the image light. This prevents and reduces the deterioration of the polarizing plate caused by heat produced by the polarizing plate.

Also, in the display system according to an aspect of the present disclosure, the reflecting surface may be a concave curved surface, and the output surface may be provided in parallel with a tangent line that passes through a center of the reflecting surface.

With this, it is possible to make the entire distance between the output surface and the reflecting surface more uniform. This prevents and reduces the occurrence of a distortion in the image formed of the image light reflected at the reflecting surface.

Also, in the display system according to an aspect of the present disclosure, the reflecting surface may be a concave curved surface and provided in an orientation in which a tangent line that passes through a center of the reflecting surface is inclined with respect to an up-down direction of the conveyance, and the output surface may be provided in an orientation in which the output surface is more inclined than the tangent line with respect to the up-down direction of the conveyance.

With this, it is possible to reduce the distance between one edge portion of the output surface and one edge portion of the reflecting surface compared to the distance between the other edge portion of the output surface and the other edge portion of the reflecting surface. This enables the image formed of the image light reflected at the reflecting surface to be displayed in a more stereoscopic manner.

Also, in the display system according to an aspect of the present disclosure, the polarizing plate may be a reflective polarizing plate that reflects the image light outputted from the output surface and not reflected at the reflecting surface, the reflecting surface may be a concave curved surface and provided in an orientation in which a tangent line that passes through a center of the reflecting surface is inclined with respect to an up-down direction of the conveyance, and the windshield may be provided in an orientation in which the windshield is more inclined than the tangent line with respect to the up-down direction of the conveyance.

With this, it is easier to cause the image light outputted from the output surface and not reflected at the reflecting surface to be reflected downward, using the polarizing plate. This prevents the image light reflected by the polarizing plate from being viewed by a person riding in the conveyance.

Also, the display system according to an aspect of the present disclosure may include a holder that rotatably holds the reflector. Here, the reflecting surface may include a first reflecting surface and a second reflecting surface that are located with respective backs facing each other, and a polarizing sheet may be laminated on each of the first reflecting surface and the second reflecting surface, the polarizing sheet being a polarizing sheet that does not directly reflect the outside light which has passed through the polarizing plate.

With this, since the holder rotatably holds the reflector, it is easy to rotate the reflector. Here, the reflector includes the first reflecting surface and the second reflecting surface whose backs face each other. As such, by rotating the reflector, it is possible to cause the first reflecting surface or the second reflecting surface to face a person riding in the conveyance. Also, the polarizing sheet that does not directly reflect outside light which has passed through the polarizing plate is laminated on each of the first reflecting surface and the second reflecting surface. When the first reflecting surface faces the person, for example, the second reflecting surface faces the windshield. In this case, the outside light that has passed through the polarizing plate can be reflected at the second reflecting surface. However, the polarizing sheet that does not directly reflect outside light which has passed through the polarizing plate is laminated on the second reflecting surface. In the case where the polarizing sheet has the optical performance of absorbing outside light that has passed through the polarizing plate, such outside light is absorbed by the polarizing sheet and thus not reflected. Also, in the case where the polarizing sheet is a $\lambda/4$ plate, the outside light that has passed through the polarizing plate passes through the $\lambda/4$ plate, and then reflected at the second reflecting surface. Such reflected outside light then passes through the $\lambda/4$ plate again and travels toward the polarizing plate. Since the outside light passes through the $\lambda/4$ plate twice as described above, the outside light is converted into polarized light that is absorbed by the polarizing plate. Stated differently, in this case, too, light (outside light) reflected at the second reflecting surface is absorbed by the polarizing plate and not outputted to outside of the windshield. In the configuration in which the first reflecting surface and the second reflecting surface are switched therebetween as described above, it is possible to prevent one of the reflecting surfaces that faces the windshield from reflecting the outside light to outside of the conveyance.

Also, in the display system according to an aspect of the present disclosure, the reflector and the outputter may be disposed in line in the front-back direction.

With this, since the rotatable reflector and the outputter are disposed is line in the front-back direction, it is possible to cause the image light from the outputter and a reflected image of the rear of the conveyance to travel toward a person riding in the conveyance, simply by rotating the reflector.

Also, in the display system according to an aspect of the present disclosure, the optics may be supported by a supporter that is light-transmissive and provided between the windshield and the reflector.

With this, the supporter that is light-transmissive provided between the windshield and the reflector supports the optics. This enables the optics to be disposed closer to the outputter than the windshield. Stated differently, it is possible for the optics to block the image light before such image light arrives at the windshield. When the lower edge position of the optics provided on the windshield is the same as that of the optics provided in the supporter, for example, the optics provided in the supporter is capable of blocking light across a wider area.

Also, in the display system according to an aspect of the present disclosure, an absorptivity of the image light or a transmissivity of the outside light in the optics may have a gradient in an up-down direction of the optics.

With this, the absorptivity of the image light or the transmissivity of the outside light in the optics have a gradient in the up-down direction. This prevents and reduces rapid changes in the light amount.

Also, in the display system according to an aspect of the present disclosure, the optics may be provided on the windshield.

With this, the optics is provided on the windshield. This enables the windshield and the optics to be integrated, thereby simplifying the structure.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the present disclosure. Therefore, among the elements in the following exemplary embodiments, those not recited in any one of the independent claims are described as optional elements.

Also, in the following exemplary embodiments, terms such as "parallel" and "orthogonal" are used in some cases to express relative orientations of two directions. These terms, however, can also mean the orientations that are not exactly the ones expressed by the terms. When the expression "two directions are in parallel" is used, for example, it means not only the case where the two directions are completely in parallel, but also the case where the two directions are substantially in parallel, unless otherwise stated. In other words, such expression also means the case where an error on the order of a few percent is included.

Light paths illustrated in the drawings in the following exemplary embodiments intend to show a fundamental idea, and thus do not necessarily reflect actual light paths.

Embodiment 1

FIG. 1 is a schematic diagram of display system 10 according to Embodiment 1. FIG. 1 shows display system 10 viewed from the left-hand side in the left-right direction of conveyance 1. Note that FIG. 1 shows a cross-sectional view of windshield 2 of conveyance 1 and ceiling 3 of conveyance 1.

Display system 10 is a system that displays an image. Display system 10 is included in conveyance 1. Conveyance 1 includes windshield 2 and ceiling 3. Windshield 2 can be also referred to as, for example, a front window or a front windshield. Examples of conveyance 1 include a vehicle, a ship, and an aircraft. The vehicle is, for example, an automobile. As shown in FIG. 1, display system 10 includes outputter 20, reflector 30, and optics 40.

Outputter 20 outputs image light that forms an image. Outputter 20 is a display device that displays the image by outputting the image light. The image is, for example, an image captured by an imager (not illustrated). The imager is, for example, a camera. The imager captures an image of the rear of conveyance 1. Note that the image may also be an image that shows, for example, the speed of conveyance 1, the detection result on an object that is in proximity of conveyance 1, navigation information from the current position to the destination of conveyance 1, and so forth. In the present embodiment, outputter 20 is mounted on ceiling 3. Outputter 20 is implemented including, for example, a liquid crystal display (LCD), an organic electroluminescence (EL) display, or a micro light emitting diode (LED) display. Outputter 20 includes output surface 21.

Output surface 21 is a surface from which image light is outputted. Stated differently, output surface 21 is a surface of outputter 20 that is a surface on which an image is displayed. Output surface 21 is provided behind windshield 2 of conveyance 1 in the front-back direction of conveyance 1. In the present embodiment, output surface 21 is provided behind windshield 2 in the front-back direction of conveyance 1 and overlaps windshield 2 in the front-back direction of conveyance 1. Image light is outputted from output surface 21 toward windshield 2 (see the bold solid line arrow pointing forward and the bold broken line arrow in FIG. 1). In the present embodiment, output surface 21 is a flat surface and is parallel both with the up-down direction and the left-right direction of conveyance 1. Output surface 21 is provided to face forward in the front-back direction of conveyance 1. Note that output surface 21 may be inclined, for example, with respect to the up-down direction of conveyance 1 or the left-right direction of conveyance 1. For example, outputter 20 is configured so that polarized image light that oscillates in a predetermined direction is outputted from output surface 21. Stated differently, the image light outputted from output surface 21 is, for example, polarized light that oscillates in a predetermined direction. More specifically, the image light outputted from output surface 21, is, for example, P-polarized light.

Reflector 30 reflects the image light outputted from output surface 21. Reflector 30 is configured including, for example, a mirror. In the present embodiment, reflector 30 is a concave mirror. Note that reflector 30 may not be a concave mirror and thus may be, for example, a flat mirror. Reflector 30 includes reflecting surface 31.

Reflecting surface 31 is a surface at which the image light outputted from output surface 21 is reflected. Reflecting surface 31 is, for example, a mirror surface. Reflecting surface 31 is provided between windshield 2 and output surface 21. Reflecting surface 31 is provided behind windshield 2 of conveyance 1 in the front-back direction of conveyance 1. In the present embodiment, reflecting surface 31 is provided behind windshield 2 in the front-back direction of conveyance 1 and overlaps windshield 2 in the front-back direction of conveyance 1. In the present embodiment, at least part of reflecting surface 31 is located in the same position as the position of at least part of output surface 21 in the up-down direction of conveyance 1. The image light outputted from output surface 21 is reflected at reflecting surface 31 downward in the up-down direction of conveyance 1 (see the bold solid line arrow pointing downward in FIG. 1). In the present embodiment, reflecting surface 31 is a concave curved surface and provided in an orientation in which tangent line L1 that passes through the center of reflecting surface 31 is inclined with respect to the up-down direction of conveyance 1. Tangent line L1 is a tangent line that contacts reflecting surface 31 at the center of reflecting surface 31. In the present embodiment, tangent line L1 is inclined upwards, with respect to the up-down direction of conveyance 1, toward output surface 21. In the present embodiment, tangent line L1 is orthogonal to the left-right direction of conveyance 1. Note that tangent line L1 may not be, for example, orthogonal to the left-right direction of conveyance 1. Also, reflecting surface 31 may not be, for example, a concave curved surface and thus may be a flat surface. In this case, for example, reflecting surface 31 may be inclined upwards, with respect to the up-down direction of conveyance 1, toward output surface 21.

Optics 40 is provided on windshield 2. Optics 40 includes polarizing plate 41.

Polarizing plate 41 absorbs or reflects the image light outputted from output surface 21 and not reflected at reflecting surface 31, and allows outside light that is light outside of conveyance 1 to pass through polarizing plate 41. Polarizing plate 41 is, for example, a transmissive polarizing plate that allows light that oscillates in a different direction from the direction in which the image light outputted from output surface 21 oscillates to pass through polarizing plate 41. When P-polarized image light is outputted from output surface 21, for example, polarizing plate 41 is a transmissive polarizing plate that allows S-polarized light to pass through polarizing plate 41. In this case, polarizing plate 41 is capable of absorbing P-polarized image light outputted from output surface 21 (see the bold broken line arrow in FIG. 1) and allowing S-polarized outside light to pass through polarizing plate 41 (see the dash-dot-dash line arrow in FIG. 1). In the above manner, polarizing plate 41 absorbs the image light outputted from output surface 21 and not reflected at reflecting surface 31 and allows polarized light, included in outside light, that oscillates in a different direction from the direction in which the image light oscillates to pass through polarizing plate 41. Note that polarizing plate 41 may be a polarizing plate that reflects the image light outputted from output surface 21 and not reflected at reflecting surface 31 and allows polarized light, included in outside light, that oscillates in a different direction from the direction in which the image light oscillates to pass through polarizing plate 41. In the present embodiment, polarizing plate 41 is bonded to a surface of windshield 2 that is the surface facing the interior of conveyance 1. Note that polarizing plate 41 may be bonded, for example, to a surface of windshield 2 that is the surface facing the exterior of conveyance 1. In the present embodiment, polarizing plate 41 is located above line L2 that passes through the upper edge portion of output surface 21 and the upper edge portion of reflector 30 in the up-down direction of conveyance 1 and below line L3 that passes through the lower edge portion of output surface 21 and the lower edge portion of reflector 30 in the up-down direction of conveyance 1. For example, polarizing plate 41 may be provided in a position that is more leftward than the position of a line that passes through the left edge portion of output surface 21 and the left edge portion of reflector 30 in the left-right direction of conveyance 1 or that is more rightward than the position of a line that passes through the right edge portion of output surface 21 and the right edge portion of reflector 30 in the left-right direction of conveyance 1. Note that the law defines the area of windshield 2 in which a material can be disposed. As such, optics 40 (polarizing plate 41) is provided within the area of windshield 2 defined by the law. When the law defines that the area of windshield 2 in which a material can be disposed is the area that is 20% or less from the upper edge portion of windshield 2, for example, optics 40 (polarizing plate 41) is provided within the area of windshield 2 that is 20% or less from the upper edge portion of windshield 2. When the law defines that the area of windshield 2 in which a material can be disposed is the area that is 4 inches or less from the upper edge portion of windshield 2, for example, optics 40 (polarizing plate 41) is provided within the area of windshield 2 that is 4 inches or less from the upper edge portion of windshield 2.

Here, the absorptivity of image light or the transmissivity of outside light in polarizing plate 41 of optics 40 may have a gradient, for example, in the up-down direction. More specifically, the absorptivity of polarizing plate 41 gradually decreases or the transmissivity of polarizing plate 41 gradually increases downward of polarizing plate 41 to form a graduation pattern. Note that the transmissivity of 70%, for example, may be ensured in the region of windshield 2 that is 20% below from the upper edge portion of windshield 2. With this, it is possible to prevent and reduce rapid changes in the light amount, thereby making the boundary portion of polarizing plate 41 invisible.

Display system 10 according to Embodiment 1 includes: outputter 20 that is provided behind windshield 2 of conveyance 1 in a front-back direction of conveyance 1 and includes output surface 21 from which image light is outputted toward windshield 2; reflector 30 that is provided between windshield 2 and output surface 21 and includes reflecting surface 31 at which the image light outputted from output surface 21 is reflected; and optics 40 that includes polarizing plate 41 and is provided on windshield 2 or between windshield 2 and reflector 30, polarizing plate 41 absorbing or reflecting the image light outputted from output surface 21 and not reflected at reflecting surface 31, and allowing outside light that is light outside of conveyance 1 to pass through polarizing plate 41.

With this, it is possible for polarizing plate 41 to absorb or reflect the image light outputted from output surface 21 and not reflected reflecting surface 31. This prevents the image light from being outputted to outside of conveyance 1. Polarizing plate 41 is also capable of allowing the outside light that is light outside of conveyance 1 to pass through polarizing plate 41. This prevents the visibility from being obstructed. As described above, it is possible to prevent the image light from being outputted to outside of conveyance 1, while preventing the visibility from being obstructed.

In display system 10 according to Embodiment 1, polarizing plate 41 is provided at least one of: above line L2 that passes through an upper edge portion of output surface 21 and an upper edge portion of reflector 30 in an up-down direction of conveyance 1; or below line L3 that passes through a lower edge portion of output surface 21 and a lower edge portion of reflector 30 in the up-down direction of conveyance 1.

With this, it is possible to prevent, in a more reliable manner, the image light that is outputted from output surface 21 and not reflected at reflecting surface 31 and that travels above line L2 passing through the upper edge portion of output surface 21 and the upper edge portion of reflector 30 in the up-down direction of conveyance 1 from being outputted to outside of conveyance 1. Also, it is possible to prevent, in a more reliable manner, the image light that is outputted from output surface 21 and not reflected at reflecting surface 31 and that travels below line L3 passing through the lower edge portion of output surface 21 and the lower edge portion of reflector 30 in the up-down direction of conveyance 1 from being outputted to outside of conveyance 1. As described above, it is possible to prevent, in a more reliable manner, the image light from being outputted to outside of conveyance 1, while preventing the visibility from being obstructed.

In display system 10 according to Embodiment 1, an absorptivity of the image light or a transmissivity of the outside light in polarizing plate 41 of optics 40 have a gradient in an up-down direction of polarizing plate 41.

With this, the absorptivity of the image light or the transmissivity of the outside light in polarizing plate 41 have a gradient in the up-down direction. This prevents and reduces rapid changes in the light amount.

In display system 10 according to Embodiment 1, optics 40 is provided on windshield 2.

With this, optics 40 is provided on windshield 2. This enables windshield 2 and optics 40 to be integrated, thereby simplifying the structure.

Note that polarizing plate 41 may be provided above line L2 that passes through the upper edge portion of output surface 21 and the upper edge portion of reflector 30 in the up-down direction of conveyance 1 and above line L3 that passes through the lower edge portion of output surface 21 and the lower edge portion of reflector 30 in the up-down direction of conveyance 1. Further, polarizing plate 41 may be provided below line L2 that passes through the upper edge portion of output surface 21 and the upper edge portion of reflector 30 in the up-down direction of conveyance 1 and below line L3 that passes through the lower edge portion of output surface 21 and the lower edge portion of reflector 30 in the up-down direction of conveyance 1.

Embodiment 2

Figure 2:
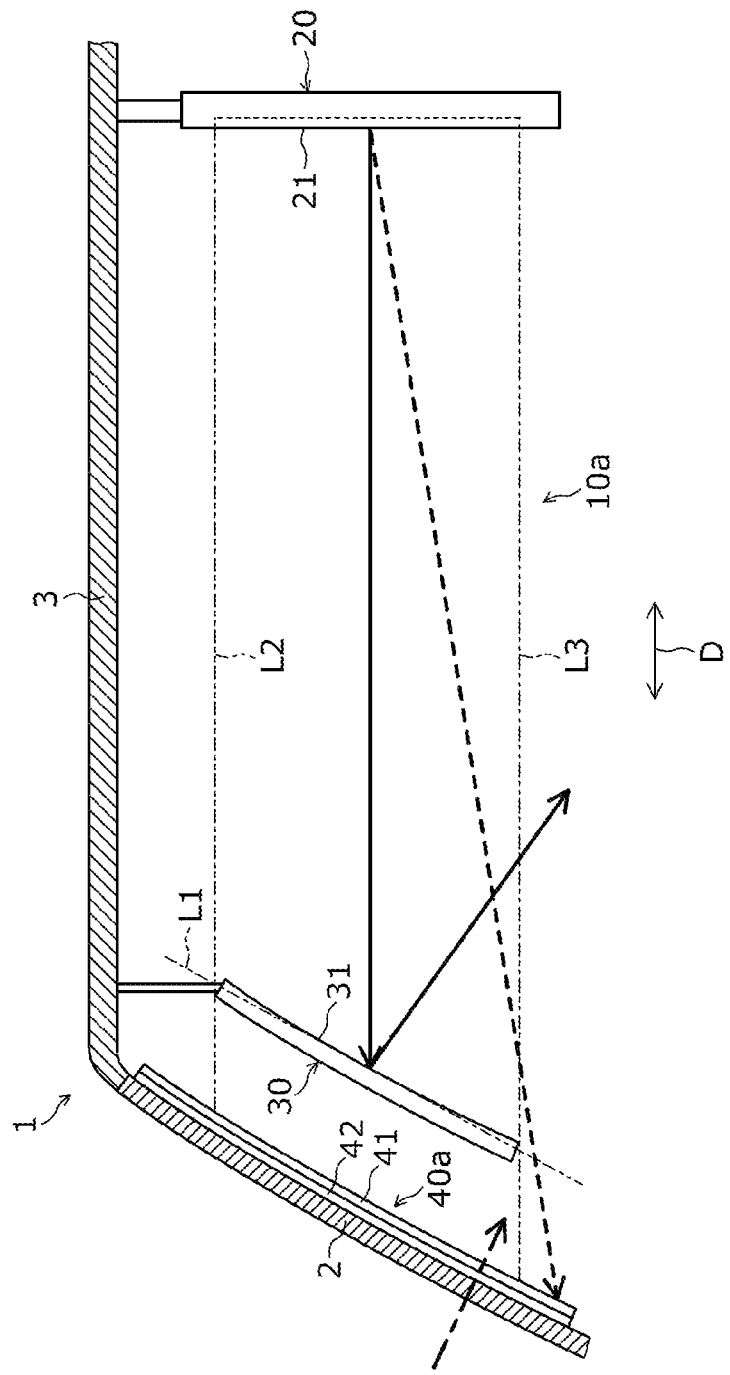
FIG. 2 is a schematic diagram of a display system according to Embodiment 2.

FIG. 2 is a schematic diagram of display system 10a according to Embodiment 2. FIG. 2 shows display system 10a viewed from the left-hand side in the left-right direction of conveyance 1. Note that FIG. 2 shows a cross-sectional view of windshield 2 of conveyance 1 and ceiling 3 of conveyance 1.

As shown in FIG. 2, display system 10a is different from display system 10 mainly in that display system 10a includes optics 40a instead of optics 40. The following mainly describes the difference from display system 10.

Optics 40a is different from optics 40 mainly in that optics 40a further includes $\lambda/4$ plate 42.

$\lambda/4$ plate 42 is provided on a side of polarizing plate 41 that is opposite to the side facing reflector 30. In the present embodiment, $\lambda/4$ plate 42 is provided between polarizing plate 41 and windshield 2. In the present embodiment, $\lambda/4$ plate 42 is bonded to a surface of windshield 2 that is the surface facing the interior of conveyance 1 and polarizing plate 41 is bonded to $\lambda/4$ plate 42 in a manner that polarizing plate 41 overlaps $\lambda/4$ plate 42. $\lambda/4$ plate 42 converts P-polarized light into circular polarized light, converts S-polarized light into circular polarized light, and converts circular polarized light into P-polarized light or S-polarized light. For example, P-polarized outside light that is incident on $\lambda/4$ plate 42 is outputted from $\lambda/4$ plate 42 as circular polarized light. Polarizing plate 41 allows only polarized light that oscillates in a predetermined direction (e.g., S-polarized light), out of the circular polarized light outputted from $\lambda/4$ plate 42, to pass through polarized plate 41. S-polarized outside light that is incident on $\lambda/4$ plate 42 is outputted from $\lambda/4$ plate 42 as circular polarized light. Polarizing plate 41 allows only polarized light that oscillates in a predetermined direction (e.g., S-polarized light), out of the circular polarized light outputted from $\lambda/4$ plate 42, to pass through polarized plate 41.

In display system 10a according to Embodiment 2, optics 40a includes $\lambda/4$ plate 42 that is provided on a side of polarizing plate 41 that is opposite to the side facing reflector 30.

With this, it is possible for $\lambda/4$ plate 42 to convert outside light that is absorbed or reflected by polarizing plate 41 in the absence of $\lambda/4$ plate 42 into light that is transmissive through polarizing plate 41. This enables a larger amount of outside light to enter inside of conveyance 1. This thus prevents the image light from being outputted to outside of conveyance 1, while further preventing the visibility from being obstructed.

Embodiment 3

Figure 3:
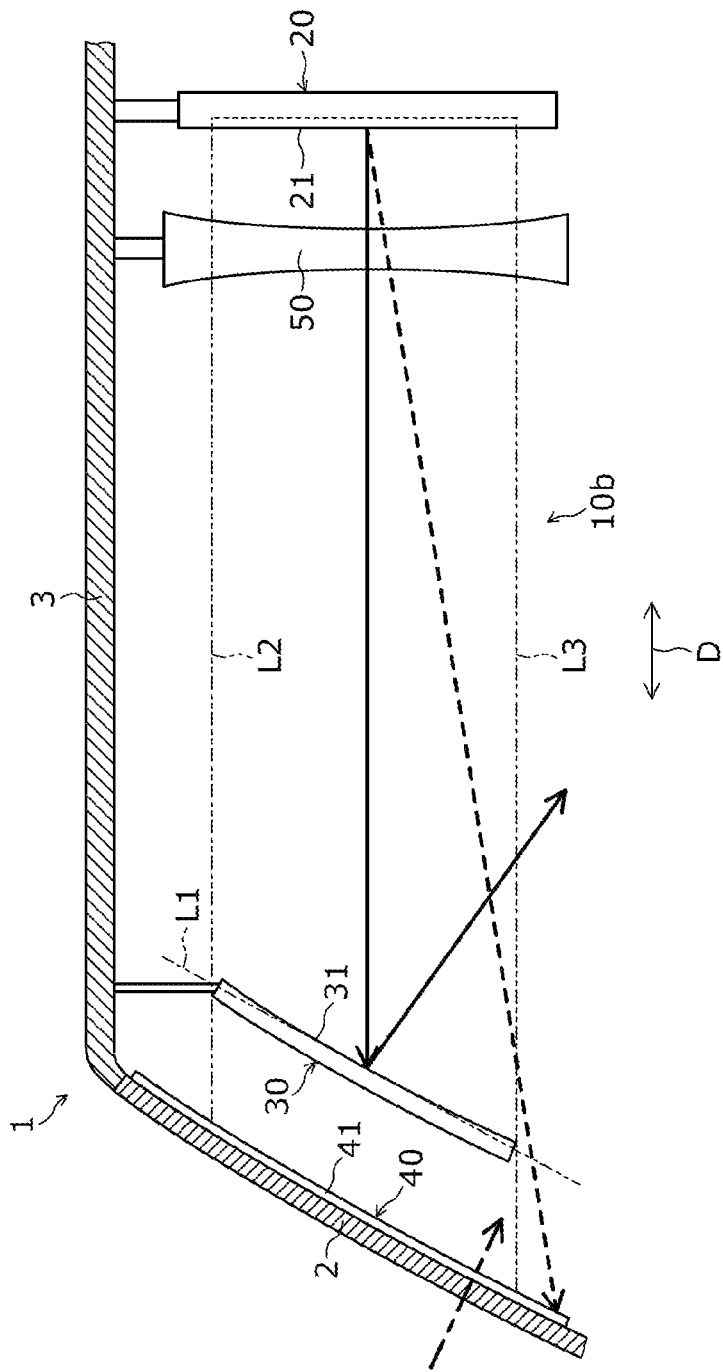
FIG. 3 is a schematic diagram of a display system according to Embodiment 3.

FIG. 3 is a schematic diagram of display system 10b according to Embodiment 3. FIG. 3 shows display system 10b viewed from the left-hand side in the left-right direction of conveyance 1. Note that FIG. 3 shows a cross-sectional view of windshield 2 of conveyance 1 and ceiling 3 of conveyance 1.

As shown in FIG. 3, display system 10b is different from display system 10 mainly in that display system 10b further includes correction lens 50. The following mainly describes the difference from display system 10.

Correction lens 50 is a lens for correcting an image formed of image light reflected at reflecting surface 31. Correction lens 50 is provided between output surface 21 and reflecting surface 31 and allows image light outputted from output surface 21 to pass through correction lens 50 toward reflecting surface 31. Correction lens 50 is attached to ceiling 3 in a manner, for example, that the position of correction lens 50 is changeable with respect to outputter 20 and reflector 30. A distortion, for example, can occur in some cases in an image formed of image light reflected at reflecting surface 31, for example, depending on the position of the eyes of a person who views such image. In this case, such person can change the direction in which the image light that has passed through correction lens 50 travels, for example, by changing the position of correction lens 50. Through this, the person can correct, for example, a distortion in and the display position of the image formed of the image light outputted from output surface 21 and reflected at reflecting surface 31. In the present embodiment, correction lens 50 is a double-sided adjustable surface lens. Note that correction lens 50 may either be, for example, a convex lens or a concaved lens.

Display system 10b according to Embodiment 3 includes correction lens 50 that is provided between output surface 21 and reflecting surface 31, allows the image light outputted from output surface 21 to pass through correction lens 50 toward reflecting surface 31, and corrects an image formed of the image light reflected at reflecting surface 31.

With this, it is possible for correction lens 50 to correct the image formed of the image light reflected at reflecting surface 31, even in the case where, for example, the position of the eyes of a person who views such image has changed.

Embodiment 4

Figure 4:
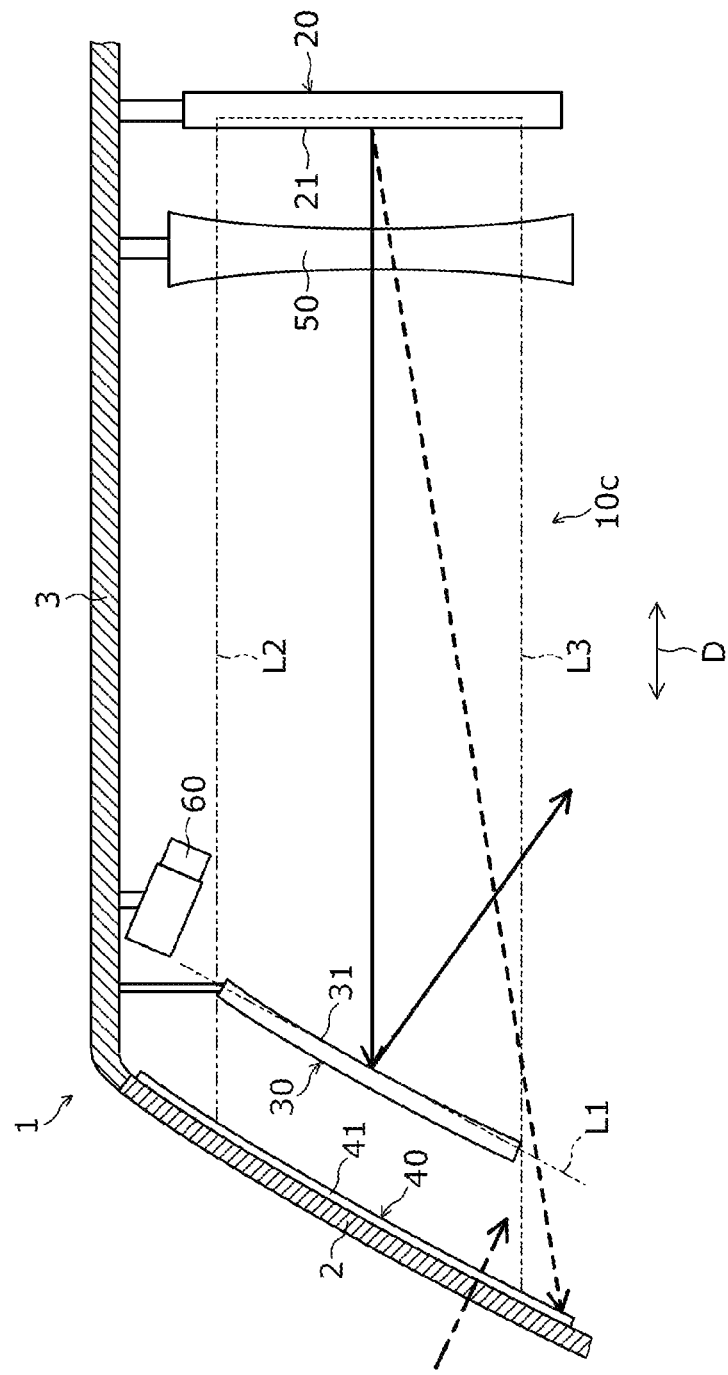
FIG. 4 is a schematic diagram of a display system according to Embodiment 4.
Figure 5:
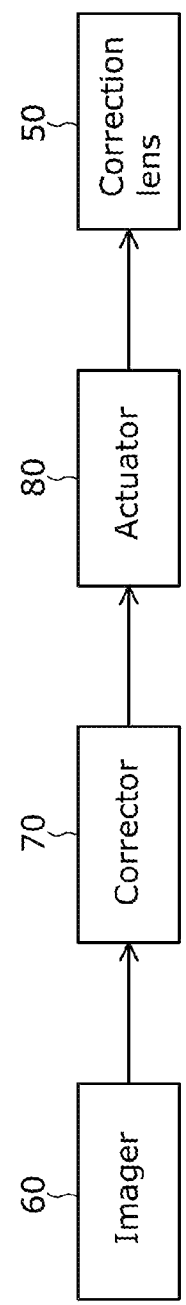
FIG. 5 is a block diagram of a functional configuration of the display system shown in FIG. 4.

FIG. 4 is a schematic diagram of display system 10c according to Embodiment 4. FIG. 4 shows display system 10c viewed from the left-hand side in the left-right direction of conveyance 1. Note that FIG. 4 shows a cross-sectional view of windshield 2 of conveyance 1 and ceiling 3 of conveyance 1. FIG. 5 is a block diagram showing the functional configuration of display system 10c shown in FIG. 4.

As shown in FIG. 4 and FIG. 5, display system 10c is different from display system 10b mainly in that display system 10c further includes imager 60, corrector 70, and actuator 80. The following mainly describes the difference from display system 10b.

Imager 60 images a person riding in conveyance 1. The person riding in conveyance 1 is, for example, the driver of conveyance 1. Imager 60 is provided in a position from which imager 60 is able to capture an image of at least one of the head or the eyes of the person riding in conveyance 1. Imager 60 is, for example, a camera.

Corrector 70 corrects an image formed of image light reflected at reflecting surface 31 by controlling the position of correction lens 50, on the basis of at least one of the position of the head or the position of the eyes of the person imaged by imager 60. When the position of at least one of the head or the eyes of the person imaged by imager 60 has moved downward, for example, corrector 70 corrects the image formed of the image light reflected at reflecting surface 31 by controlling the position of correction lens 50 to cause the lower edge portion of correction lens 50 to be close to output surface 21. When the position of at least one of the head or the eyes of the person imaged by imager 60 has moved upward, for example, corrector 70 corrects the image formed of the image light reflected at reflecting surface 31 by controlling the position of correction lens 50 to cause the upper edge portion of correction lens 50 to be close to output surface 21. When the position of at least one of the head or the eyes of the person imaged by imager 60 has moved rightward, for example, corrector 70 corrects the image formed of the image light reflected at reflecting surface 31 by controlling the position of correction lens 50 to cause the horizontal position of correction lens 50 to move rightward. When the position of at least one of the head or the eyes of the person imaged by imager 60 has moved leftward, for example, corrector 70 corrects the image formed of the image light reflected at reflecting surface 31 by controlling the position of correction lens 50 to cause the horizontal position of correction lens 50 to move leftward. In the present embodiment, corrector 70 is electrically connected to actuator 80 and controls the position of correction lens 50 by driving actuator 80. Corrector 70 is implemented by, for example, a processor that executes a program.

Actuator 80 changes the position of correction lens 50 by being driven. Actuator 80 is, for example, an electrically-operated actuator and is mechanically connected to correction lens 50.

Display system 10c according to Embodiment 4 includes imager 60 that images a person riding in conveyance 1; correction lens 50 that is provided between output surface 21 and reflecting surface 31 and allows the image light outputted from output surface 21 to pass through correction lens 50 toward reflecting surface 31, correction lens 50 being a correction lens for correcting an image formed of the image light reflected at reflecting surface 31; and corrector 70 that corrects the image formed of the image light reflected at reflecting surface 31 by controlling a position of correction lens 50, based on at least one of a position of a head of the person or a position of an eye of the person, the person having been imaged by imager 60.

With this, it is easy to correct the image formed of the image light reflected at reflecting surface 31 by controlling the position of correction lens 50, on the basis of at least one of the position of the head or the position of the eyes of a person who views such image, even when, for example, the position of the eyes of such person has changed.

Embodiment 5

Figure 6:
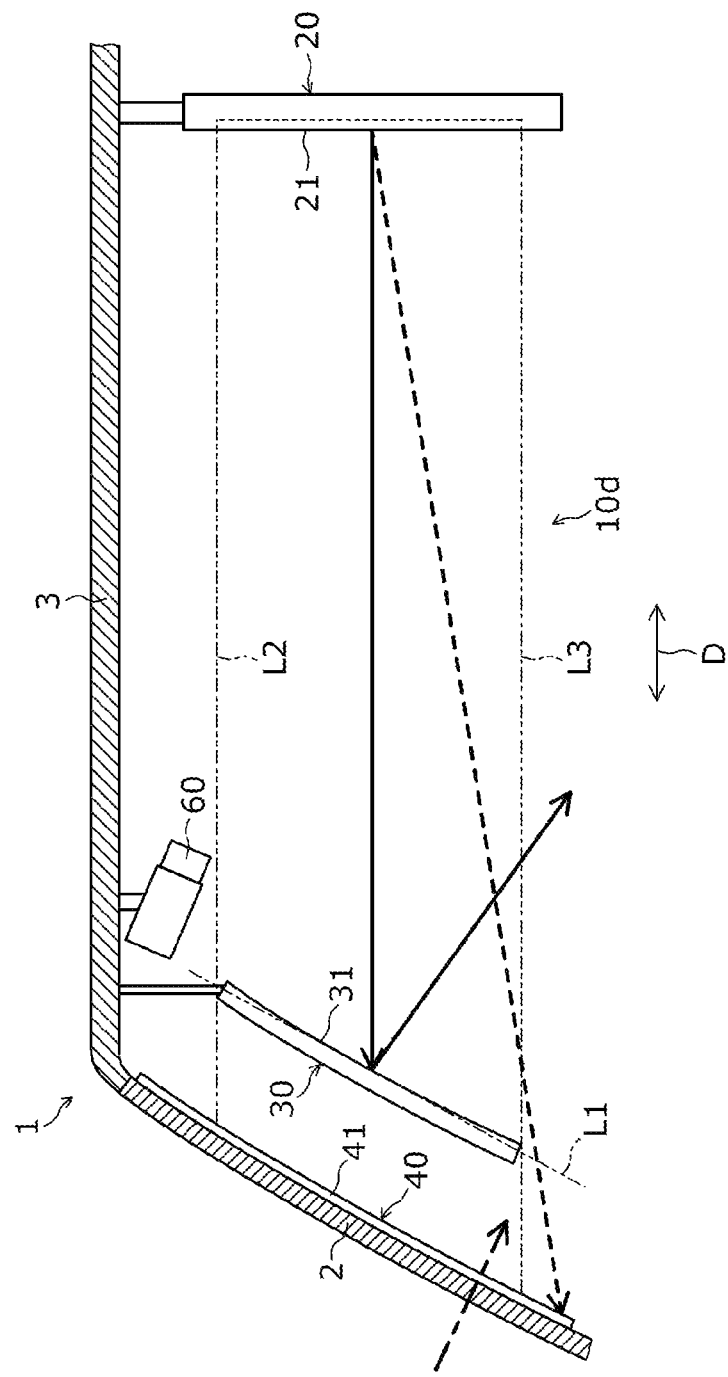
FIG. 6 is a schematic diagram of a display system according to Embodiment 5.
Figure 7:
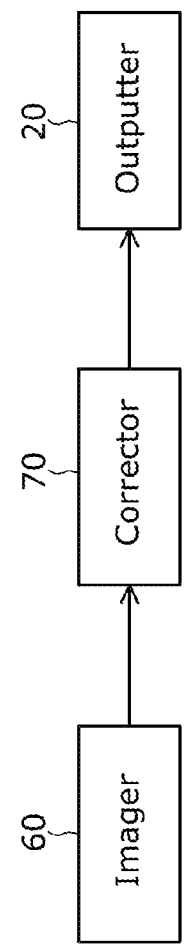
FIG. 7 is a block diagram of a functional configuration of the display system shown in FIG. 6.

FIG. 6 is a schematic diagram of display system 10d according to Embodiment 5. FIG. 6 shows display system 10d viewed from the left-hand side in the left-right direction of conveyance 1. Note that FIG. 6 shows a cross-sectional view of windshield 2 of conveyance 1 and ceiling 3 of conveyance 1. FIG. 7 is a block diagram showing the functional configuration of display system 10d shown in FIG. 6.

As shown in FIG. 6 and FIG. 7, display system 10d is different from display system 10 mainly in that display system 10d further includes imager 60 and corrector 70. The following mainly describes the difference from display system 10.

For the details of imager 60, the foregoing descriptions in Embodiment 4 will be referred to, and thus detailed descriptions of imager 60 are omitted here.

Corrector 70 corrects an image formed of image light reflected at reflecting surface 31 by correcting an image signal that is the base of the image light, on the basis of at least one of the position of the head or the position of the eyes of a person imaged by imager 60. When the position of at least one of the head or the eyes of the person imaged by imager 60 has moved downward, for example, corrector 70 corrects the image formed of the image light reflected at reflecting surface 31 by correcting the image signal to cause an upper side of the image displayed on output surface 21 to be displayed bigger. When the position of at least one of the head or the eyes of the person imaged by imager 60 has moved upward, for example, corrector 70 corrects the image formed of the image light reflected at reflecting surface 31 by correcting the image signal to cause a lower side of the image displayed on output surface 21 to be displayed bigger. When the position of at least one of the head or the eyes of the person imaged by imager 60 has moved rightward, for example, corrector 70 corrects the image formed of the image light reflected at reflecting surface 31 by correcting the image signal to cause more left side of the image displayed on output surface 21 to be displayed bigger. When the position of at least one of the head or the eyes of the person imaged by imager 60 has moved leftward, for example, corrector 70 corrects the image formed of the image light reflected at reflecting surface 31 by correcting the image signal to cause more right side of the image displayed on output surface 21 to be displayed bigger. In the present embodiment, corrector 70 is electrically connected to outputter 20 and corrects the image signal by controlling outputter 20. Corrector 70 is implemented by, for example, a processor that executes a program.

Display system 10d according to Embodiment 5 includes imager 60 that images a person riding in conveyance 1; and corrector 70 that corrects an image formed of the image light reflected at reflecting surface 31 by correcting an image signal that is a base of the image signal, based on at least one of a position of a head of the person or a position of an eye of the person, the person having been imaged by imager 60.

With this, it is easy to correct the image formed of the image light reflected at reflecting surface 31 by correcting the image signal that is the base of the image light, on the basis of at least one of the position of the head or the position of the eyes of a person who views such image, even when, for example, at least one of the position of the head or the position of the eyes of such person has changed.

Embodiment 6

Figure 8:
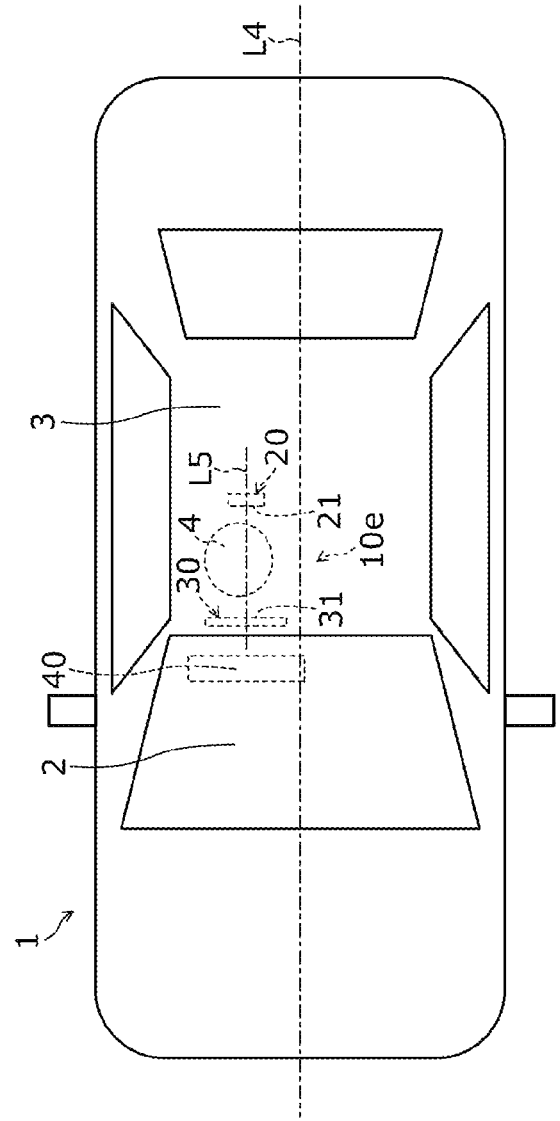
FIG. 8 is a schematic diagram of a display system according to Embodiment 6.

FIG. 8 is a schematic diagram of display system 10e according to Embodiment 6. FIG. 8 shows display system 10e viewed from above in the up-down direction of conveyance 1.

As shown in FIG. 8, in the left-right direction of conveyance 1, output surface 21 and reflecting surface 31 in display system 10e are provided on the driver's seat side of conveyance 1 relative to the center of conveyance 1. Assuming that the center line of conveyance 1 in the left-right direction of conveyance 1 is center line L4, the driver's seat of conveyance 1, output surface 21, and reflecting surface 31 are provided on one side with respect to center line L4 in the left-right direction of conveyance 1. Also, output surface 21 and reflecting surface 31 are provided in an orientation in which line L5 that passes through the center of output surface 21 and the center of reflecting surface 31 passes through head 4 of a person riding in conveyance 1, when viewed from the up-down direction of conveyance 1. The position of head 4 is, for example, a design-related position of head 4. Line L5 may be set, for example, to pass through the center of head 4 of the person riding in conveyance 1, when viewed from the up-down direction of conveyance 1. In the present embodiment, line L5 is parallel with the front-back direction of conveyance 1, when viewed from the up-down direction of conveyance 1.

In display system 10e according to Embodiment 6, in a left-right direction of conveyance 1, output surface 21 and reflecting surface 31 are provided on a driver's seat side of conveyance 1 relative to a center of conveyance 1.

With this, it is possible to decrease the difference between the light paths in the left-right direction when viewed from a person seated in the driver's seat. This prevents and reduces the occurrence of a distortion in the image formed of the image light reflected at reflecting surface 31.

In display system 10e according to Embodiment 6, when viewed from an up-down direction of conveyance 1, output surface 21 and reflecting surface 31 are provided in an orientation in which line L5 that passes through a center of output surface 21 and a center of reflecting surface 31 passes through head 4 of a person riding in conveyance 1.

With this, it is possible to decrease the difference between the light paths in the left-right direction when viewed from a person seated in the driver's seat. This prevents and reduces the occurrence of a distortion in the image formed of the image light reflected at reflecting surface 31.

Embodiment 7

Figure 9:
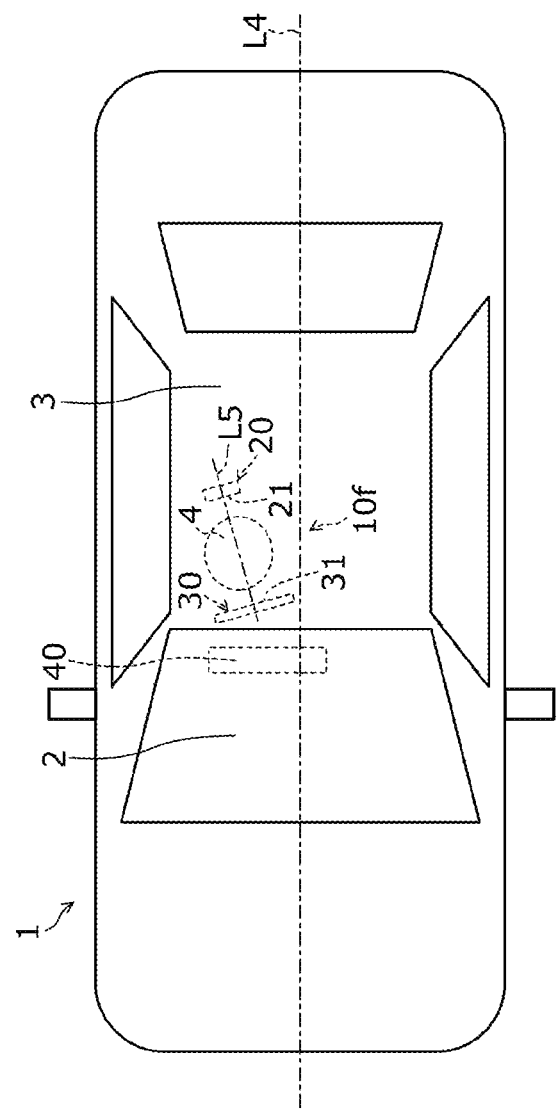
FIG. 9 is a schematic diagram of a display system according to Embodiment 7.

FIG. 9 is a schematic diagram of display system 10f according to Embodiment 7. FIG. 9 shows display system 10f viewed from above in the up-down direction of conveyance 1.

As shown in FIG. 9, in the left-right direction of conveyance 1, output surface 21 and reflecting surface 31 in display system 10f are provided on the driver's seat side of conveyance 1 relative to the center of conveyance 1. Assuming that the center line of conveyance 1 in the left-right direction of conveyance 1 is center line L4, the driver's seat of conveyance 1, output surface 21, and reflecting surface 31 are provided on one side with respect to center line L4 in the left-right direction of conveyance 1. Also, output surface 21 and reflecting surface 31 are provided in an orientation in which line L5 that passes through the center of output surface 21 and the center of reflecting surface 31 passes through head 4 of a person riding in conveyance 1, when viewed from the up-down direction of conveyance 1. The position of head 4 is, for example, a design-related position of head 4. In the present embodiment, line L5 is set to pass through the center of head 4 of the person riding in conveyance 1, when viewed from the up-down direction of conveyance 1. In the present embodiment, line L5 is inclined with respect to the front-back direction of conveyance 1, when viewed from the up-down direction of conveyance 1.

In display system 10f according to Embodiment 7, in a left-right direction of conveyance 1, output surface 21 and reflecting surface 31 are provided on a driver's seat side of conveyance 1 relative to a center of conveyance 1.

With this, it is possible to decrease the difference between the light paths in the left-right direction when viewed from a person seated in the driver's seat. This prevents and reduces the occurrence of a distortion in the image formed of the image light reflected at reflecting surface 31.

In display system 10f according to Embodiment 7, when viewed from an up-down direction of conveyance 1, output surface 21 and reflecting surface 31 are provided in an orientation in which line L5 that passes through a center of output surface 21 and a center of reflecting surface 31 passes through head 4 of a person riding in conveyance 1.

With this, it is possible to decrease the difference between the light paths in the left-right direction when viewed from a person riding in conveyance 1. This prevents and reduces the occurrence of a distortion in the image formed of the image light reflected at reflecting surface 31.

Embodiment 8

Figure 10:
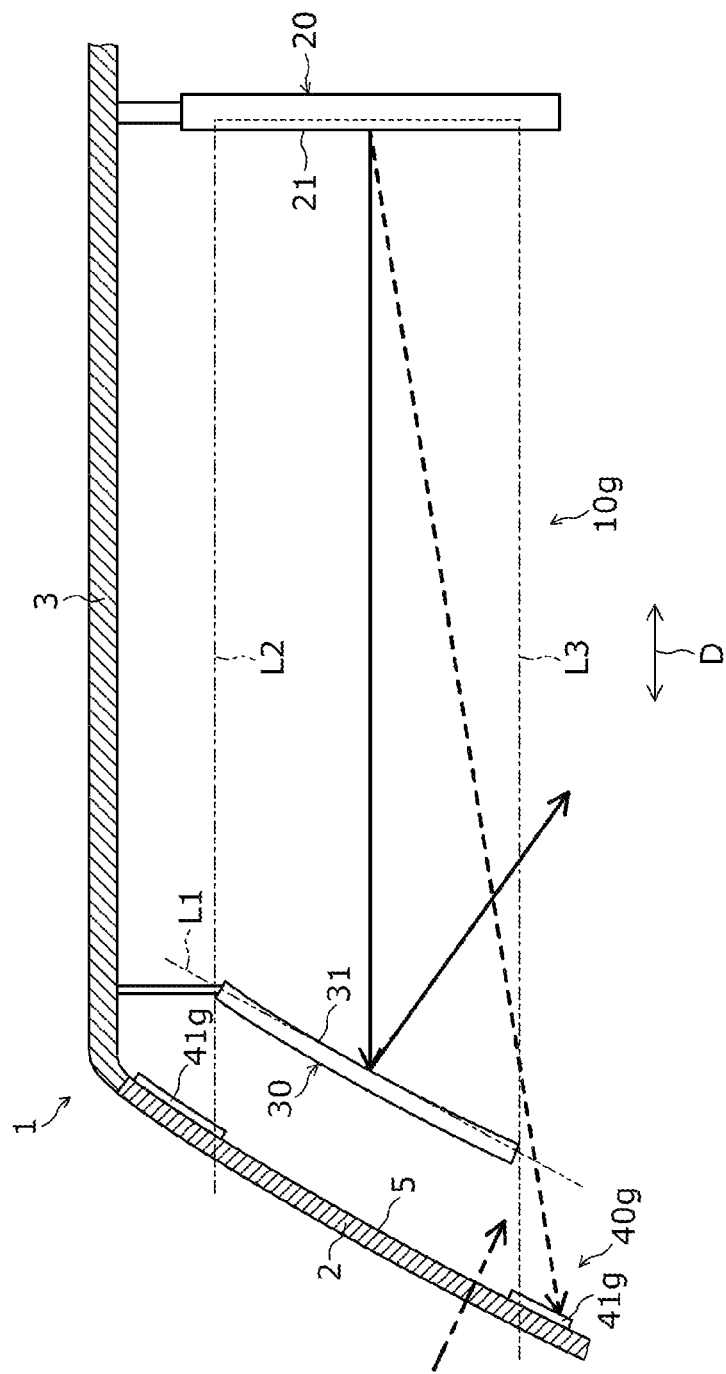
FIG. 10 is a schematic diagram of a display system according to Embodiment 8.

FIG. 10 is a schematic diagram of display system 10g according to Embodiment 8. FIG. 10 shows display system 10g viewed from the left-hand side in the left-right direction of conveyance 1. Note that FIG. 10 shows a cross-sectional view of windshield 2 of conveyance 1 and ceiling 3 of conveyance 1.

As shown in FIG. 10, display system 10g is different from display system 10 mainly in that display system 10g includes optics 40g instead of optics 40. The following mainly describes the difference from display system 10.

Optics 40g is different from optics 40 mainly in that optics 40g includes at least one polarizing plate 41g instead of polarizing plate 41.

Optics 41*g* is not provided in at least part of portion 5 in windshield 2 that is a portion that overlaps reflector 30 in direction D in which output surface 21 and reflecting surface 31 are disposed in line. Portion 5 is a portion that overlaps reflector 30, when viewed from direction D, which is a portion on a surface of windshield 2 that is the surface facing the interior of conveyance 1.

In display system 10*g* according to Embodiment 8, polarizing plate 41*g* is not provided in at least part of portion 5 in windshield 2, portion 5 being a portion that overlaps reflector 30 in direction D in which output surface 21 and reflecting surface 31 are disposed in line.

With this, portion 5 in windshield 2 that is a portion overlapping reflector 30 in direction D in which output surface 21 and reflecting surface 31 are disposed in line is less exposed to the image light outputted from output surface 21. Also, polarizing plate 41*g* is not provided in at least part of such portion 5 that is less exposed to the image light outputted from output surface 21. This prevents the visibility from being obstructed and the image light from being outputted to outside of conveyance 1, while preventing an increase in the cost relating to polarizing plate 41*g*.

Embodiment 9

Figure 11:
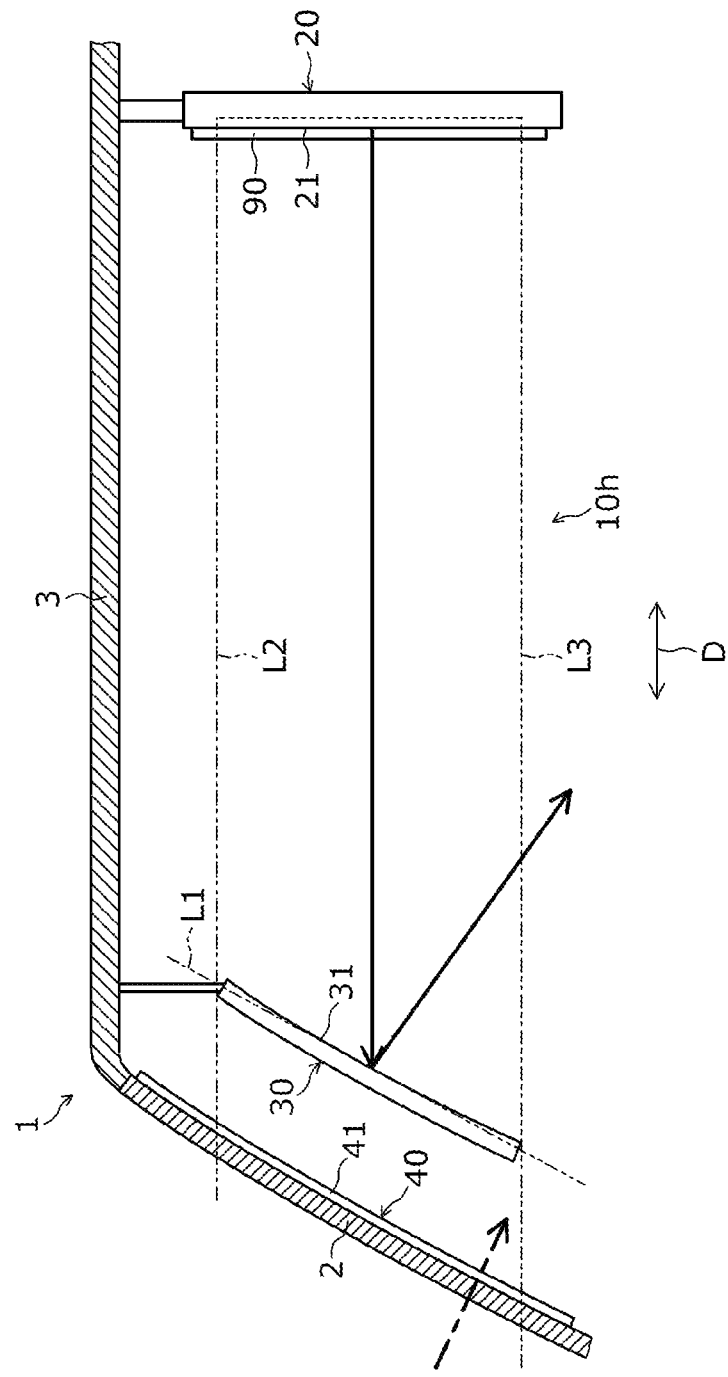
FIG. 11 is a schematic diagram of a display system according to Embodiment 9.

FIG. 11 is a schematic diagram of display system 10*h* according to Embodiment 9. FIG. 11 shows display system 10*h* viewed from the left-hand side in the left-right direction of conveyance 1. Note that FIG. 11 shows a cross-sectional view of windshield 2 of conveyance 1 and ceiling 3 of conveyance 1.

As shown in FIG. 11, display system 10*h* is different from display system 10 mainly in that display system 10*h* further includes louver film 90. The following mainly describes the difference from display system 10.

Louver film 90 is provided between output surface 21 and reflecting surface 31. Louver film 90 allows image light outputted in a direction from output surface 21 to reflecting surface 31 to pass through louver film 90 and blocks image light outputted more downward in the up-down direction of conveyance 1 than the direction from output surface 21 to reflecting surface 31. The direction from output surface 21 to reflecting surface 31 is a direction, in direction D, from the side of output surface 21 to the side of reflecting surface 31. Louver film 90 is formed of a plurality of plate materials, each of which is parallel with direction D and orthogonal to direction D. In the present embodiment, louver film 90 is bonded to output surface 21. Note that louver film 90 may be provided, for example, spaced apart from output surface 21.

Display system 10*h* according to Embodiment 9 includes louver film 90 that is provided between output surface 21 and reflecting surface 31, allows the image light outputted in a direction from output surface 21 to reflecting surface 31 to pass through louver film 90, and blocks the image light that is outputted more downward than the direction from output surface 21 to reflecting surface 31 in an up-down direction of conveyance 1.

With this, it is possible for louver film 90 to block the image light that is outputted more downward in the up-down direction of conveyance 1 than the direction from output surface 21 to reflecting surface 31. This prevents the image light from being outputted to outside of conveyance 1, while further preventing the visibility from being obstructed.

Embodiment 10

Figure 12:
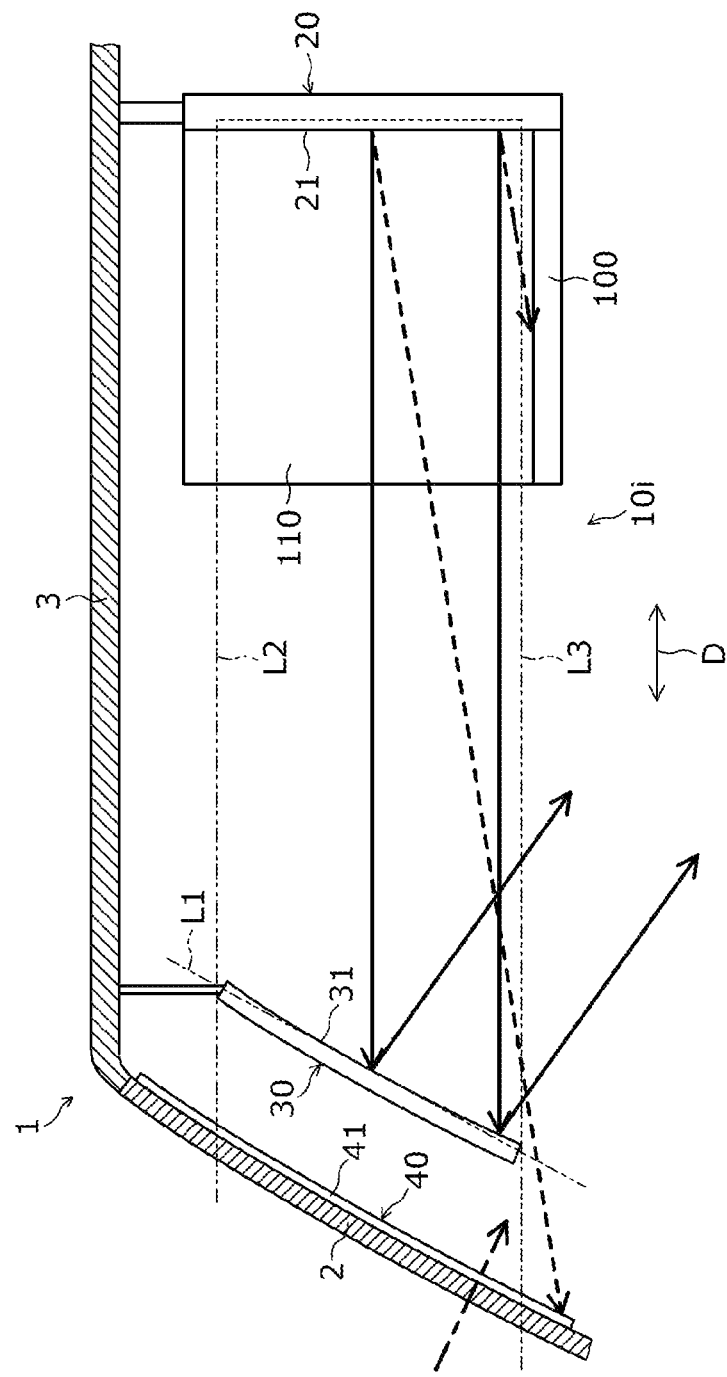
FIG. 12 is a schematic diagram of a display system according to Embodiment 10.

FIG. 12 is a schematic diagram of display system 10*i* according to Embodiment 10. FIG. 12 shows display system 10*i* viewed from the left-hand side in the left-right direction of conveyance 1. Note that FIG. 12 shows a cross-sectional view of windshield 2 of conveyance 1 and ceiling 3 of conveyance 1.

As shown in FIG. 12, display system 10*i* is different from display system 10 mainly in that display system 10*i* further includes blocker 100 and blocker 110. The following mainly describes the difference from display system 10.

Blocker 100 blocks image light that is outputted more downward in the up-down direction of conveyance 1 than the direction from output surface 21 to reflecting surface 31 (see the bold dash-dot-dot-dash line arrow in FIG. 12). The direction from output surface 21 to reflecting surface 31 is a direction, in direction D, from the side of output surface 21 to the side of reflecting surface 31. Blocker 100 is provided in outputter 20. Blocker 100 has a plate shape and is provided in parallel with direction D. Blocker 100 is jutting from outputter 20 toward reflector 30 in a more downward position than the position of output surface 21. Blocker 100 is bonded to outputter 20 via, for example, adhesive.

Blocker 110 blocks image light that is outputted more rightward in the left-right direction of conveyance 1 than the direction from output surface 21 to reflecting surface 31. Blocker 110 is provided in outputter 20. Blocker 110 has a plate shape and is provided in parallel with direction D and orthogonal to blocker 100. Blocker 110 is jutting from outputter 20 toward reflector 30 in a more rightward position than the position of output surface 21. Blocker 110 is bonded to outputter 20 via, for example, adhesive.

Note that display system 10*i* may include a blocker that blocks image light that is outputted more leftward in the left-right direction of conveyance 1 than the direction from output surface 21 to reflecting surface 31.

Display system 10*i* according to Embodiment 10 includes blocker 100 that blocks the image light that is outputted more downward than a direction from output surface 21 to reflecting surface 31 in an up-down direction of conveyance 1.

With this, it is possible for blocker 100 to block the image light that is outputted more downward in the up-down direction of conveyance 1 than the direction from output surface 21 to reflecting surface 31. This prevents the image light from being outputted to outside of conveyance 1, while further preventing the visibility from being obstructed.

Embodiment 11

Figure 13:
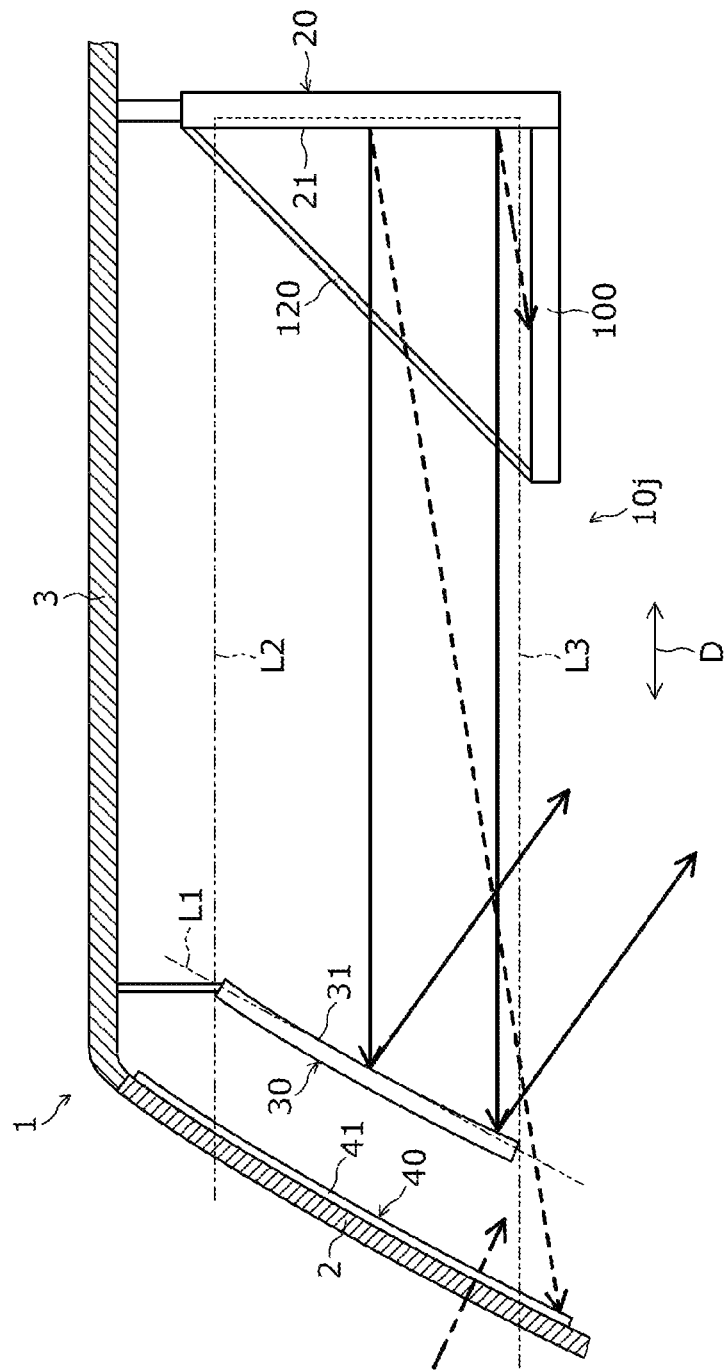
FIG. 13 is a schematic diagram of a display system according to Embodiment 11.

FIG. 13 is a schematic diagram of display system 10*j* according to Embodiment 11. FIG. 13 shows display system 10*j* viewed from the left-hand side in the left-right direction of conveyance 1. Note that FIG. 13 shows a cross-sectional view of windshield 2 of conveyance 1 and ceiling 3 of conveyance 1.

As shown in FIG. 13, display system 10*j* is different from display system 10 mainly in that display system 10*j* further includes blocker 100 and supporting material 120. The following mainly describes the difference from display system 10.

For the details of blocker 100, the foregoing descriptions in Embodiment 10 will be referred to, and thus detailed descriptions of blocker 100 are omitted here.

Supporting material 120 is a material that supports blocker 100. Supporting material 120 is connected to the upper edge portion of outputter 20 and an edge portion of blocker 100 that is opposite to the edge portion on the side of outputter 20. Supporting material 120 is provided not to overlap output surface 21 in direction D.

Display system 10j according to Embodiment 11 includes blocker 100 that blocks the image light that is outputted more downward than a direction from output surface 21 to reflecting surface 31 in an up-down direction of conveyance 1.

With this, it is possible for blocker 100 to block the image light that is outputted more downward in the up-down direction of conveyance 1 than the direction from output surface 21 to reflecting surface 31. This prevents the image light from being outputted to outside of conveyance 1, while further preventing the visibility from being obstructed.

Embodiment 12

Figure 14:
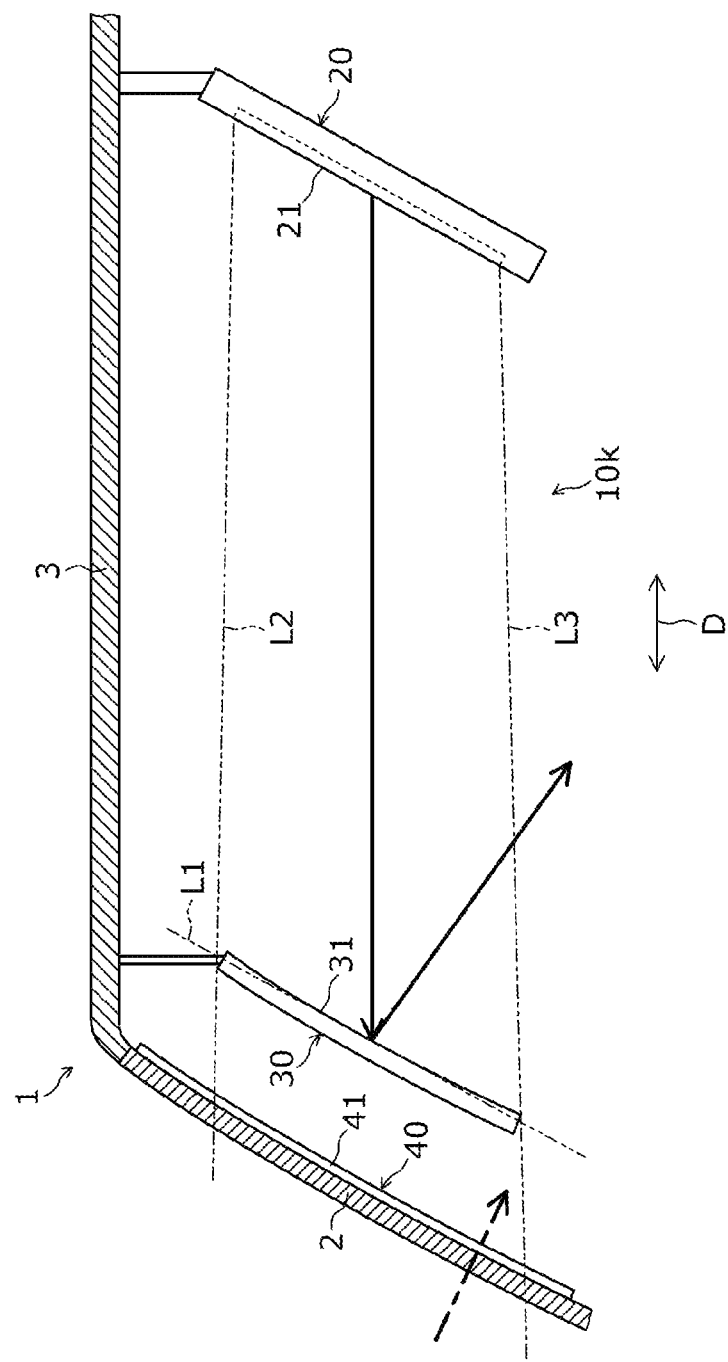
FIG. 14 is a schematic diagram of a display system according to Embodiment 12.

FIG. 14 is a schematic diagram of display system 10k according to Embodiment 12. FIG. 14 shows display system 10k viewed from the left-hand side in the left-right direction of conveyance 1. Note that FIG. 14 shows a cross-sectional view of windshield 2 of conveyance 1 and ceiling 3 of conveyance 1.

As shown in FIG. 14, display system 10k is different from display system 10 mainly in that the position of outputter 20 in display system 10k is different from the position of outputter 20 in display system 10. The following mainly describes the difference from display system 10.

Output surface 21 is provided in parallel with tangent line L1 that passes through the center of reflecting surface 31. Tangent line L1 is inclined upwards, with respect to the up-down direction of conveyance 1, toward output surface 21. Output surface 21 is inclined upwards, with respect to the up-down direction of conveyance 1, away from reflecting surface 31. The angle at which output surface 21 is inclined with respect to the up-down direction of conveyance 1 is equal to the angle at which tangent line L1 is inclined with respect to the up-down direction of conveyance 1.

In display system 10k according to Embodiment 12, reflecting surface 31 is a concave curved surface, and output surface 21 is provided in parallel with tangent line L1 that passes through a center of reflecting surface 31.

With this, it is possible to make the entire distance between output surface 21 and reflecting surface 31 more uniform. This prevents the occurrence of a distortion in the image formed of the image light reflected at reflecting surface 31.

Embodiment 13

Figure 15:
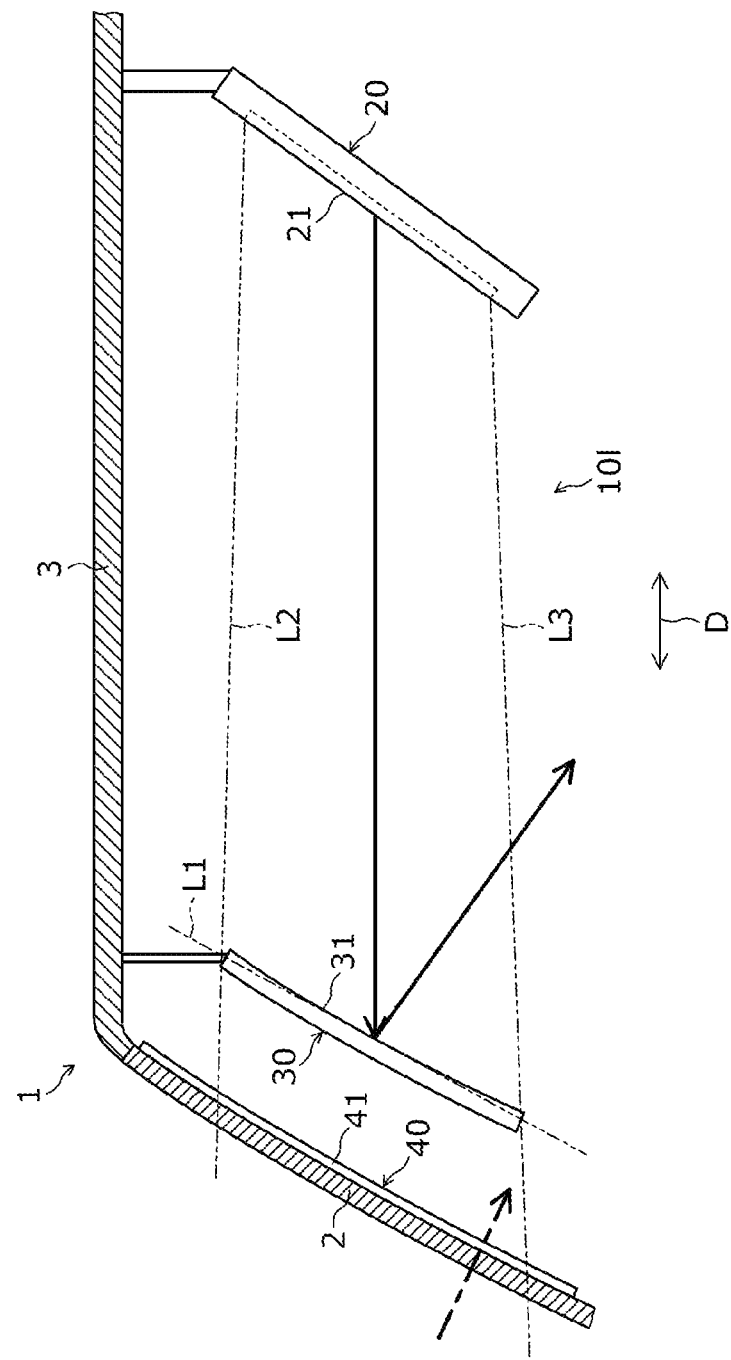
FIG. 15 is a schematic diagram of a display system according to Embodiment 13.

FIG. 15 is a schematic diagram of display system 10l according to Embodiment 13. FIG. 15 shows display system 10l viewed from the left-hand side in the left-right direction of conveyance 1. Note that FIG. 15 shows a cross-sectional view of windshield 2 of conveyance 1 and ceiling 3 of conveyance 1.

As shown in FIG. 15, display system 10l is different from display system 10 mainly in that the position of outputter 20 in display system 10l is different from the position of outputter 20 in display system 10. The following mainly describes the difference from display system 10.

Output surface 21 is provided in an orientation in which output surface 21 is more inclined than tangent line L1 that passes through the center of reflecting surface 31 with respect to the up-down direction of conveyance 1. Tangent line L1 is inclined upwards, with respect to the up-down direction of conveyance 1, toward output surface 21. Output surface 21 is inclined upwards, with respect to the up-down direction of conveyance 1, away from reflecting surface 31. The angle at which output surface 21 is inclined with respect to the up-down direction of conveyance 1 is greater than the angle at which tangent line L1 is inclined with respect to the up-down direction of conveyance 1. With this, in a virtual image that is viewable at reflecting surface 31 having a concave curved surface, the length of the light path from the upper edge of output surface 21 to reflecting surface 31 is longer than the length of the light path from the lower edge of output surface 21 to reflecting surface 31. As a result, the upper side of the virtual image to be viewed appears to be present more backward than the lower side. When an image displayed on output surface 21 is an image of the rear of conveyance 1 as described above, the upper side of the image shows the following vehicle of conveyance 1 and the lower side of the image shows the road surface. As such, in the virtual image to be viewed, the following vehicle appears to be present backward with respect to the road surface. This enables display system 10l to display an image in a more stereoscopic manner.

In display system 10l according to Embodiment 13, reflecting surface 31 is a concave curved surface and provided in an orientation in which tangent line L1 that passes through a center of reflecting surface 31 is inclined with respect to an up-down direction of conveyance 1, and output surface 21 is provided in an orientation in which output surface 21 is more inclined than tangent line L1 with respect to the up-down direction of conveyance 1.

With this, it is possible to reduce the distance between one edge portion of output surface 21 and one edge portion of reflecting surface 31 compared to the distance between the other edge portion of output surface 21 and the other edge portion of reflecting surface 31. This enables the image formed of the image light reflected at reflecting surface 31 to be displayed in a more stereoscopic manner.

Embodiment 14

Figure 16:
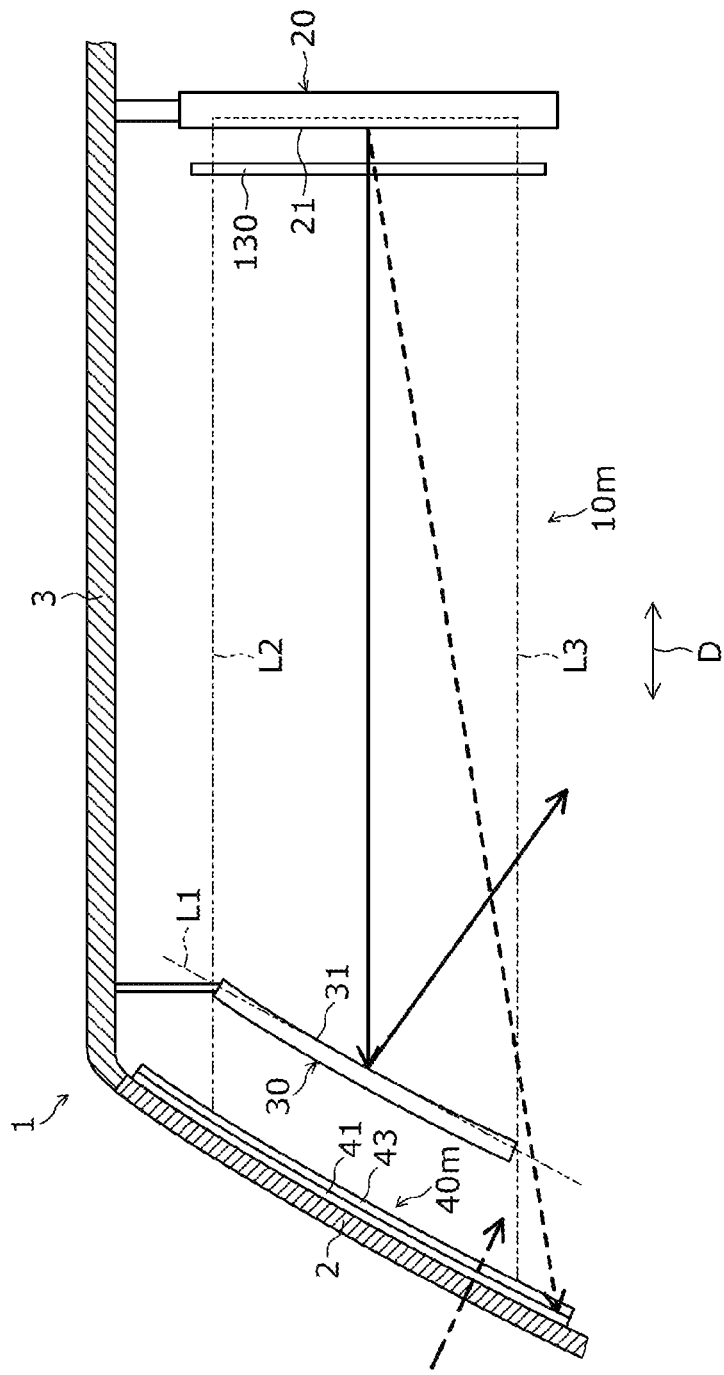
FIG. 16 is a schematic diagram of a display system according to Embodiment 14.

FIG. 16 is a schematic diagram of display system 10m according to Embodiment 14. FIG. 16 shows display system 10m viewed from the left-hand side in the left-right direction of conveyance 1. Note that FIG. 16 shows a cross-sectional view of windshield 2 of conveyance 1 and ceiling 3 of conveyance 1.

As shown in FIG. 16, display system 10m is different from display system 10 mainly in that display system 10m further includes $\lambda/4$ plate 130 and that display system 10m includes optics 40m instead of optics 40. The following mainly describes the differences from display system 10.

$\lambda/4$ plate 130 is provided between output surface 21 and reflecting surface 31. $\lambda/4$ plate 130 is bonded, for example, to output surface 21, but may be provided spaced apart from output surface 21. $\lambda/4$ plate 130 converts P-polarized light into circular polarized light, converts S-polarized light into circular polarized light, and converts circular polarized light into P-polarized light or S-polarized light.

Optics 40m includes $\lambda/4$ plate 43 that is provided on a side of polarizing plate 41 that is the side facing reflector 30. In the present embodiment, $\lambda/4$ plate 43 is bonded to polarizing plate 41 in a manner that $\lambda/4$ plate 43 overlaps polarizing plate 41. $\lambda/4$ plate 43 converts P-polarized light into circular polarized light, converts S-polarized light into circular polarized light, and converts circular polarized light into P-polarized light or S-polarized light.

For example, P-polarized image light outputted from output surface 21 is converted into circular polarized light by $\lambda/4$ plate 130 and reflected at reflecting surface 31 as the circular polarized light. Also, for example, P-polarized image light outputted from output surface 21 is converted into circular polarized light by λ/4 plate 43. Such converted circular polarized light is then converted back into P-polarized light by λ/4 plate 43, and absorbed by polarizing plate 41 as the P-polarized light. Also, for example, S-polarized outside light is converted into circular polarized light by λ/4 plate 43 after passing through polarizing plate 41 to be outputted to inside of conveyance 1. Consequently, since both the image light and the outside light are converted into circular polarized light, it is possible for the driver of conveyance 1 to view both of the light beams even when such driver is wearing sunglasses. This prevents the visibility from being obstructed.

Note, for example, that λ/4 plate 43 may be provided to enable P-polarized image light outputted from output surface 21 to be converted into circular polarized light by λ/4 plate 43, and then such circular polarized light to be converted into S-polarized light by λ/4 plate 43. In this case, polarizing plate 41 may be a transmissive polarizing plate that allows P-polarized light to pass through polarizing plate 41. In this case, for example, P-polarized outside light is converted into circular polarized light by λ/4 plate 43 after passing through polarizing plate 41 to be outputted to inside of conveyance 1.

Display system 10m according to Embodiment 14 includes λ/4 plate 130 that is provided between output surface 21 and reflecting surface 31. Optics 40m includes λ/4 plate 43 that is provided on a side of polarizing plate 41 that is a side facing reflector 30.

With this, it is possible to convert the outside light into circular polarized light and cause such circular polarized light to be outputted to inside of conveyance 1. This prevents the image light from being outputted to outside of the conveyance, while further preventing the visibility from being obstructed.

Embodiment 15

Figure 17:
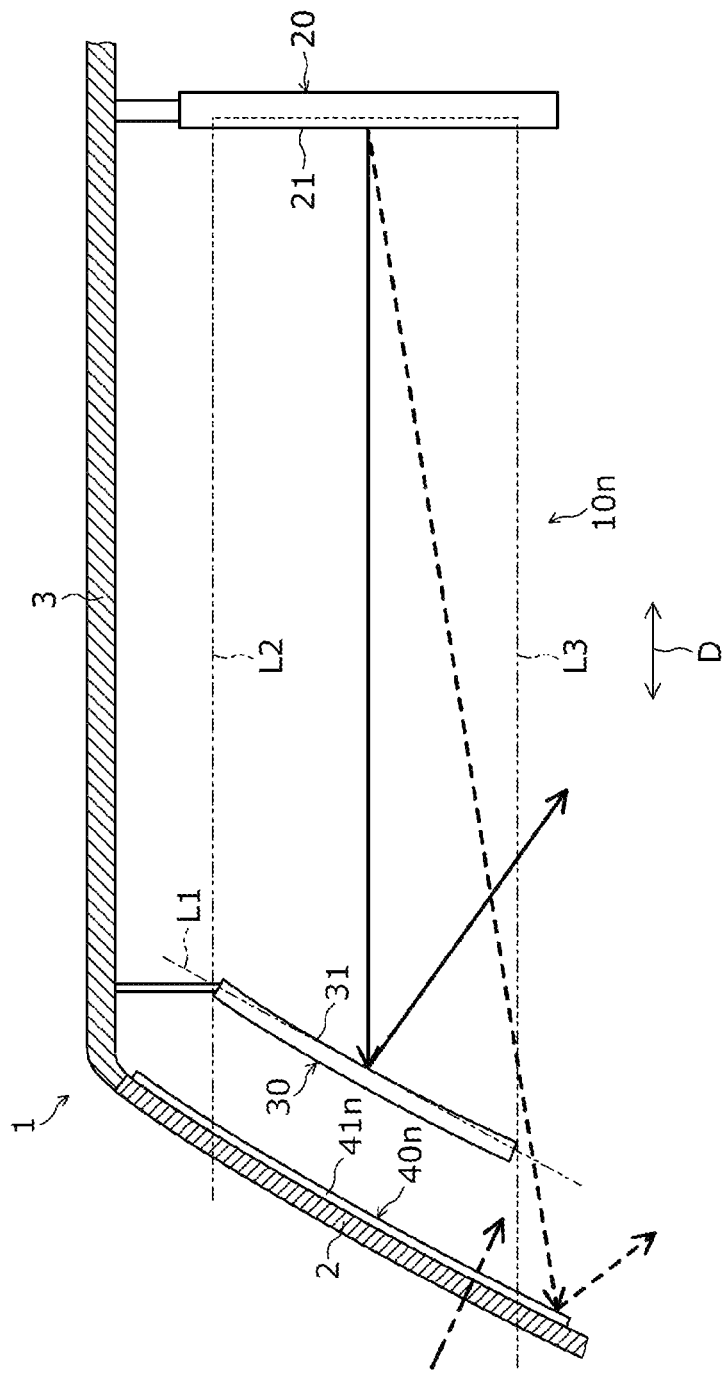
FIG. 17 is a schematic diagram of a display system according to Embodiment 15.

FIG. 17 is a schematic diagram of display system 10n according to Embodiment 15. FIG. 17 shows display system 10n viewed from the left-hand side in the left-right direction of conveyance 1. Note that FIG. 17 shows a cross-sectional view of windshield 2 of conveyance 1 and ceiling 3 of conveyance 1.

As shown in FIG. 17, display system 10n is different from display system 10 mainly in that display system 10n includes optics 40n instead of optics 40. The following mainly describes the difference from display system 10.

Optics 40n is different from optics 40 mainly in that optics 40n includes polarizing plate 41n instead of polarizing plate 41.

Polarizing plate 41n is a reflective polarizing plate that reflects image light outputted from output surface 21 and not reflected at reflecting surface 31. Polarizing plate 41n reflects light that oscillates in the same direction as the direction in which the image light outputted from output surface 21 oscillates. When P-polarized image light is outputted from output surface 21, for example, polarizing plate 41n is a reflective polarizing plate that reflects P-polarized light. In this case, polarizing plate 41n is capable of reflecting P-polarized image light outputted from output surface 21 (see the bold broken line arrow in FIG. 17) and allowing S-polarized outside light to pass through polarizing plate 41n (see the bold dash-dot-dash line arrow in FIG. 17). As in the foregoing manner, polarizing plate 41n reflects the image light outputted from output surface 21 and not reflected at reflecting surface 31, and allows polarized light, out of outside light, that oscillates in a different direction from the direction in which the image light oscillates.

In display system 10n according to Embodiment 15, polarizing plate 41n is a reflective polarizing plate that reflects the image light outputted from output surface 21 and not reflected at reflecting surface 31.

With this, it is possible to prevent polarizing plate 41n from producing heat as a result of absorbing the image light. This prevents the deterioration of polarizing plate 41n caused by heat produced by polarizing plate 41n.

Embodiment 16

Figure 18:
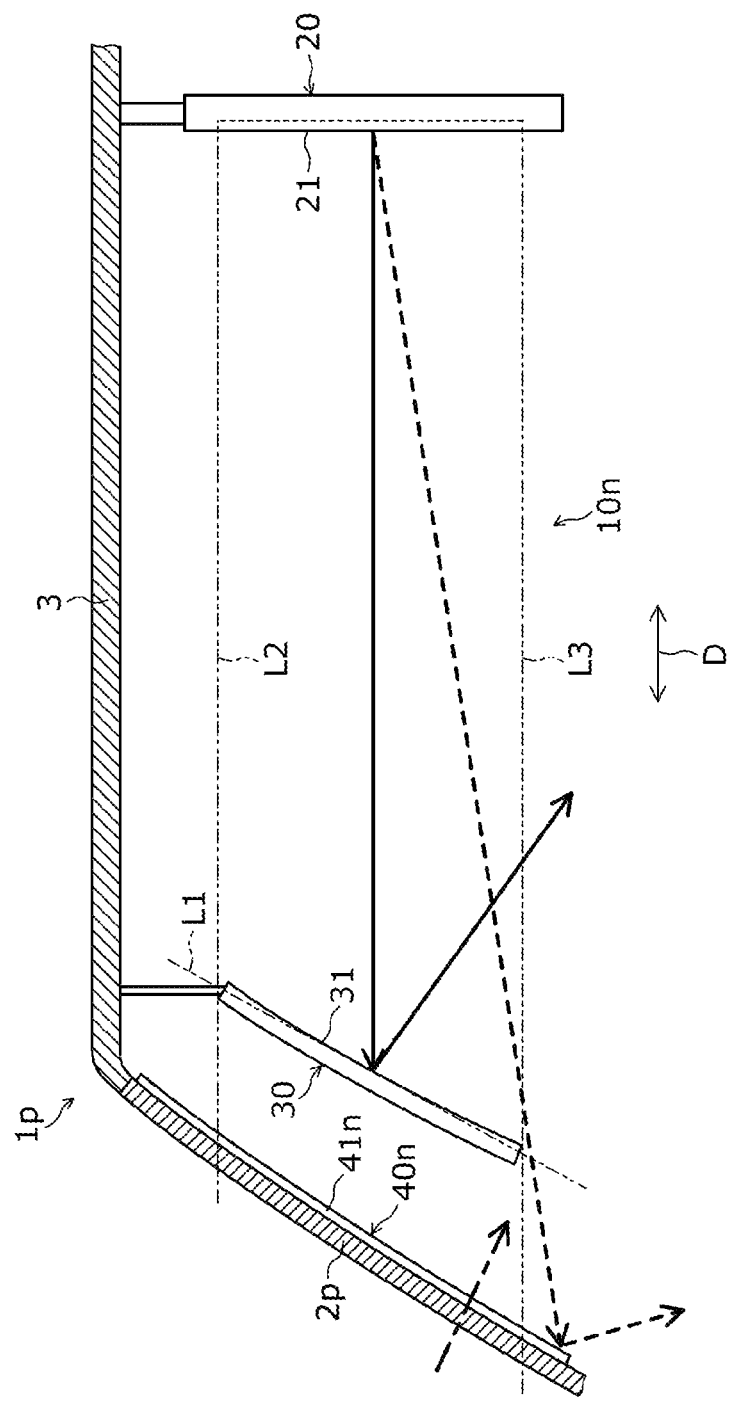
FIG. 18 is a schematic diagram of a display system according to Embodiment 16.

FIG. 18 is a schematic diagram of display system 10n according to Embodiment 16. FIG. 18 shows display system 10n viewed from the left-hand side in the left-right direction of conveyance 1p. Note that FIG. 18 shows a cross-sectional view of windshield 2p of conveyance 1p and ceiling 3 of conveyance 1p.

As shown in FIG. 18, display system 10n is mounted in conveyance 1p instead of conveyance 1. Conveyance 1p includes windshield 2p that is different from windshield 2. Windshield 2p is provided in an orientation in which windshield 2p is more inclined than tangent line L1 with respect to the up-down direction of conveyance 1p. Windshield 2p is provided in an orientation in which windshield 2p is more inclined than tangent line L1 that passes through the center of reflecting surface 31 with respect to the up-down direction of conveyance 1p. Tangent line L1 is inclined upwards, with respect to the up-down direction of conveyance 1p, toward output surface 21. Windshield 2p is inclined upwards, with respect to the up-down direction of conveyance 1p, from front to rear in the front-back direction of conveyance 1p. The angle at which windshield 2p is inclined with respect to the up-down direction of conveyance 1p is greater than the angle at which tangent line L1 is inclined with respect to the up-down direction of conveyance 1p.

In display system 10n according to Embodiment 16, polarizing plate 41n is a reflective polarizing plate that reflects the image light outputted from output surface 21 and not reflected at reflecting surface 31, reflecting surface 31 is a concave curved surface and provided in an orientation in which tangent line L1 that passes through a center of reflecting surface 31 is inclined with respect to an up-down direction of conveyance 1p, and windshield 2p is provided in an orientation in which windshield 2p is more inclined than tangent line L1 with respect to the up-down direction of conveyance 1p.

With this, it is easier to cause the image light outputted from output surface 21 and not reflected at reflecting surface 31 to be reflected downward, using polarizing plate 41n. This prevents the image light reflected by polarizing plate 41n from being viewed by a person riding in conveyance 1p.

Embodiment 17

Figure 19:
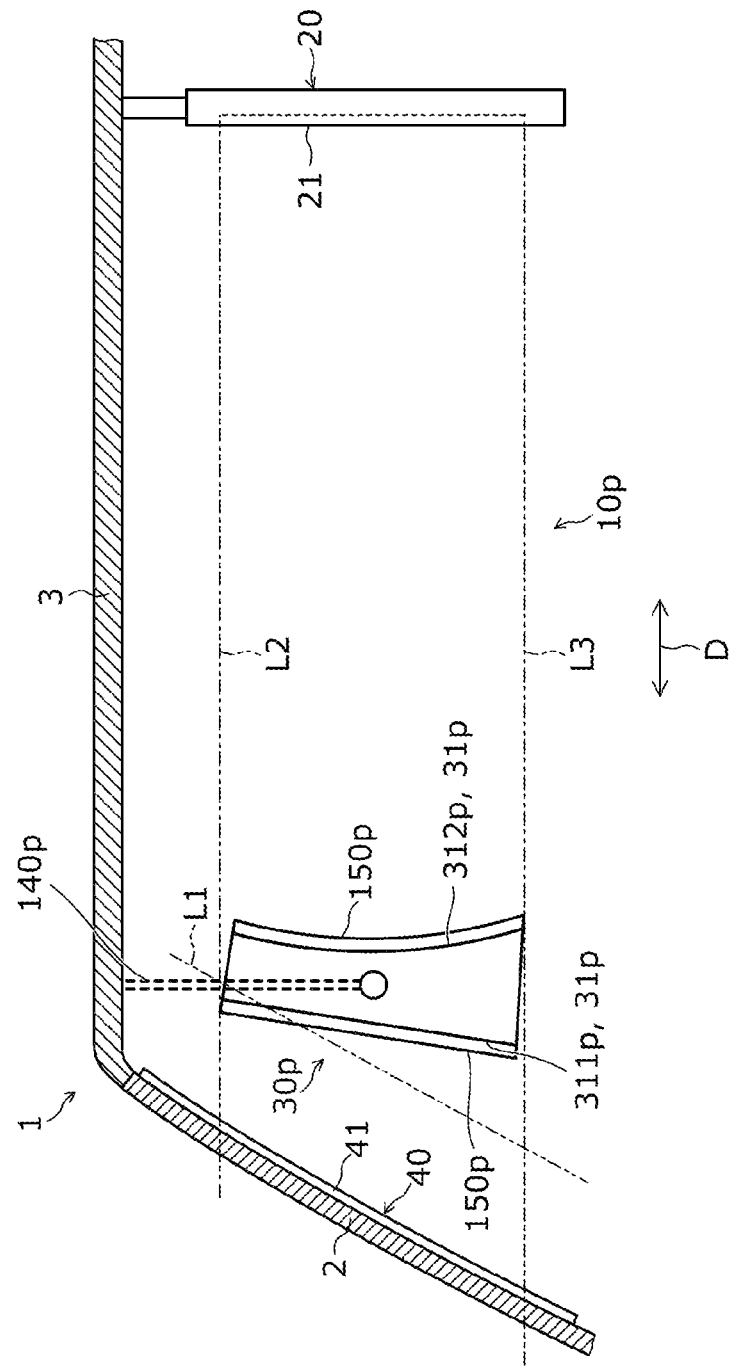
FIG. 19 is a schematic diagram of a display system according to Embodiment 17.
Figure 20:
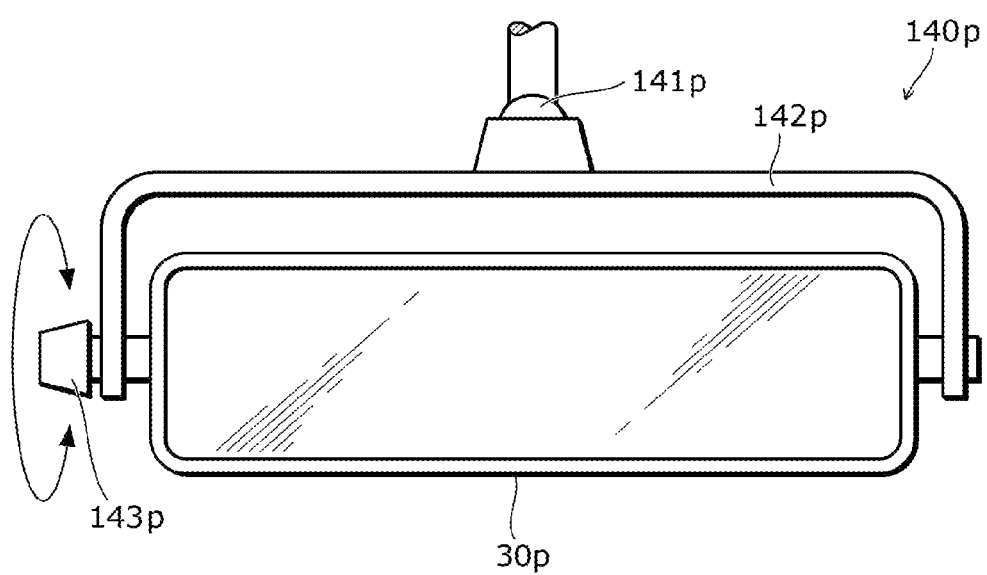
FIG. 20 is a plan view of the display system according to Embodiment 17.

FIG. 19 is a schematic diagram of display system 10p according to Embodiment 17. FIG. 20 is a plan view of display system 10p according to Embodiment 17. FIG. 19 shows display system 10p viewed from the left-hand side in the left-right direction of conveyance 1. Note that FIG. 19 shows a cross-sectional view of windshield 2 of conveyance 1 and ceiling 3 of conveyance 1.

As shown in FIG. 19, display system 10p is different from display system 10 mainly in that display system 10p includes reflector 30p instead of reflector 30 and that display system 10p includes holder 140p that rotatably holds reflector 30*p* (indicated by the broken lines). The following mainly describes the differences from display system 10.

Reflecting surfaces 31*p* of reflector 30*p* includes first reflecting surface 311*p* and second reflecting surface 312*p* that are located with the respective backs facing each other. More specifically, first reflecting surface 311*p* and second reflecting surface 312*p* are located with the respective backs facing each other in the front-back direction of conveyance 1. First reflecting surface 311*p* is a flat mirror and second reflecting surface 312*p* is a concave mirror. Polarizing sheet 150*p* is laminated on each of first reflecting surface 311*p* and second reflecting surface 312*p*. Polarizing sheet 150*p* has the properties of allowing image light outputted from output surface 21 to pass through polarizing sheet 150*p* and not directly reflecting outside light that has passed through polarizing plate 41.

Figure 21:
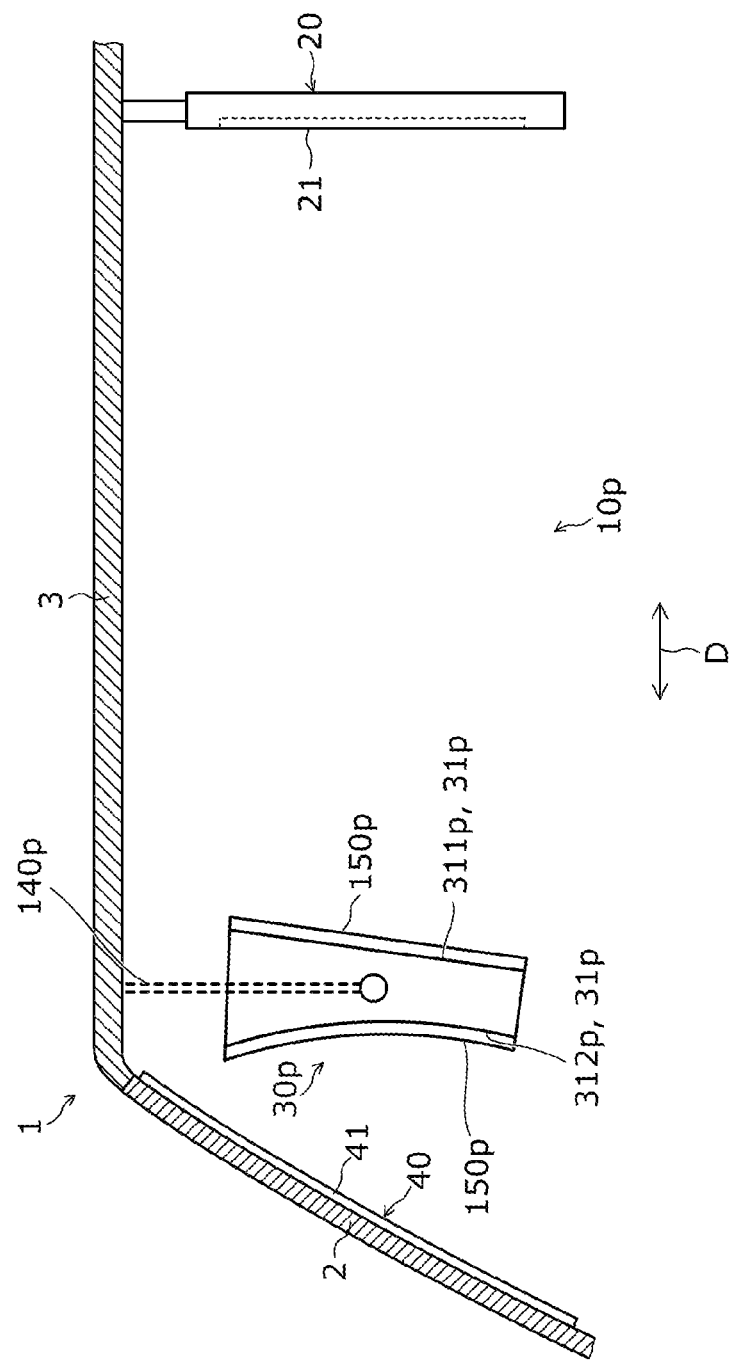
FIG. 21 is a schematic diagram of the display system according to Embodiment 17 in which the orientation of a reflector has been adjusted.

Holder 140*p* includes ball joint 141*p*, holder body 142*p*, and operation portion 143*p*. Ball joint 141*p* connects holder body 142*p* to ceiling 3 of conveyance 1. Ball joint 141*p* enables the adjustment of the orientation of holder body 142*p*. Holder body 142*p* is a frame that holds reflector 30*p*. Holder body 142*p* has an inverted U-shape in a plan view of holder body 142*p*. Reflector 30*p* is rotatably held at the both edge portions of holder body 142*p*. Operation portion 143*p* is connected to reflector 30*p* via holder body 142*p*. When a person operates operation portion 143*p* to rotate, reflector 30*p* also rotates in conjunction with such operation. With this, it is possible to switch between causing first reflecting surface 311*p* of reflector 30*p* to face forward of conveyance 1 (see FIG. 19) and causing second reflecting surface 312*p* to face forward of conveyance 1 (see FIG. 21). FIG. 21 is a schematic diagram of display system 10*p* according to Embodiment 17 in which the orientation of reflector 30*p* has been adjusted.

In the state shown in FIG. 19, second reflecting surface 312*p*, which is a concave mirror, faces output surface 21. In such state, outputter 20 outputs image light from output surface 21. Thus, the image light is reflected at second reflecting surface 312*p* and then travels toward a person riding in conveyance 1. Here, in the case where polarizing sheet 150*p* is a polarizing sheet that absorbs S-polarized light and allows other polarized light to pass through the polarizing sheet, the image light, which is P-polarized light, passes through polarizing sheet 150*p* to arrive and reflected at second reflecting surface 312*p*, and passes through polarizing sheet 150*p* again to travel toward the person.

Meanwhile, although outside light incident from windshield 2 includes P-polarized light and S-polarized light, the P-polarized light is absorbed after passing through polarizing plate 41, and the S-polarized light arrives at polarizing sheet 150*p* of first reflecting surface 311*p*. Such S-polarized light is absorbed by polarizing sheet 150*p* and thus not reflected at first reflecting surface 311*p*. Stated differently, the outside light that has passed through polarizing plate 41 is not directly reflected by polarizing sheet 150*p*.

In the state shown in FIG. 21, first reflecting surface 311*p*, which is a flat mirror, faces output surface 21. When outputter 20 is OFF in such state, no image light is outputted from output surface 21. As such, outside light incident from the rear of conveyance 1 is reflected at first reflecting surface 311*p*. Although such outside light includes P-polarized light and S-polarized light, the S-polarized light is absorbed after passing through polarizing sheet 150*p* of first reflecting surface 311*p* to be converted into P-polarized light, and reflected at first reflecting surface 311*p*. The P-polarized light that has been reflected passes through polarizing sheet 150*p* again and travels toward the person. Note that ON and OFF of outputter 20 may be switched either manually or in conjunction with a rotation operation of reflector 30*p*.

Meanwhile, although outside light incident from windshield 2 also includes P-polarized light and S-polarized light, the P-polarized light is absorbed after passing through polarizing plate 41, and the S-polarized light arrives at polarizing sheet 150*p* of second reflecting surface 312*p*. Such S-polarized light is absorbed by polarizing sheet 150*p*, and thus not reflected at second reflecting surface 312*p*. Stated differently, the outside light that has passed through polarizing plate 41 is not directly reflected by polarizing sheet 150*p*.

As described above, by reversing reflector 30*p*, it is possible to switch between whether a person views image light from outputter 20 or a reflected image of the rear of conveyance 1. Such switching is performed, for example, in accordance with person's likings or when outputter 20 has a trouble. In either case, polarizing sheet 150*p* of each of the reflecting surfaces (first reflecting surface 311*p* and second reflecting surface 312*p*) prevents outside light incident from windshield 2 from being reflected at reflector 30*p* and outputted again from windshield 2.

Figure 22:
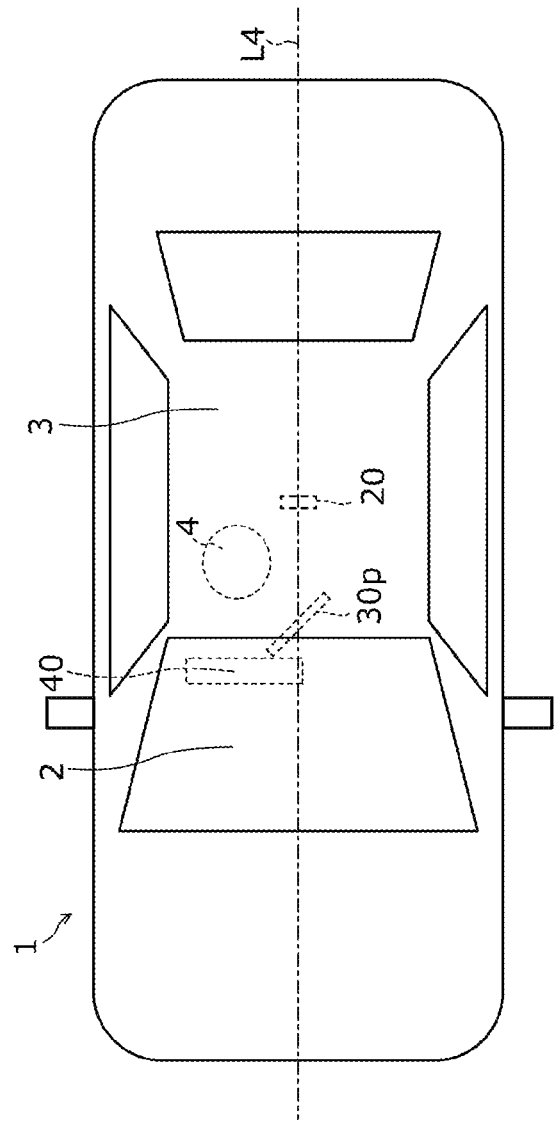
FIG. 22 is a top view showing the positional relation between the reflector and an outputter in the display system according to Embodiment 17.

FIG. 22 is a top view showing a positional relation between reflector 30*p* and outputter 20 in display system 10*p* according to Embodiment 17. As shown in FIG. 22, reflector 30*p* and outputter 20 are disposed in line in the front-back direction of conveyance 1. More specifically, the present embodiment shows an example case where reflector 30*p* and outputter 20 are disposed along center line L4, but reflector 30*p* and outputter 20 may be disposed off center line L4 so long as reflector 30*p* and outputter 20 are disposed in line in the front-back direction. Such layout enables image light from outputter 20 and a reflected image of the rear of conveyance 1 to travel toward the person riding in conveyance 1 (head 4) simply by reversing reflector 30*p*.

The present embodiment has shown an example case where polarizing sheet 150*p* is a polarizing sheet that absorbs S-polarized light and allows other polarized light to pass through the polarizing sheet. Polarizing sheet 150*p*, however, may be any polarizing sheet that absorbs or reflects outside light that has passed through polarizing plate 41. Polarizing sheet 150*p* may thus be, for example, a polarizing sheet that absorbs P-polarized light and allows other polarized light to pass through the polarizing sheet. In this case, outputter 20 is simply required to output S-polarized image light from output surface 21.

Alternatively, polarizing sheet 150*p* may be a $\lambda/4$ plate. In the case where polarizing sheet 150*p* is a $\lambda/4$ plate, outside light that has passed through polarizing plate 41 passes through the $\lambda/4$ plate, and then reflected at a reflecting surface (first reflecting surface 311*p* or second reflecting surface 312*p*). Such reflected outside light then passes through the $\lambda/4$ plate again and travels toward polarizing plate 41. As described above, since the outside light passes through the $\lambda/4$ plate twice, the outside light is converted into polarized light that is absorbed by polarizing plate 41. Stated differently, in this case too, light (outside light) reflected at a reflecting surface is absorbed by polarizing plate 41 and not outputted to outside of windshield 2.

Display system 10*p* according to Embodiment 17 includes holder 140*p* that rotatably holds reflector 30*p*. Reflecting surface 31*p* includes first reflecting surface 311*p* and second reflecting surface 312*p* that are located with respective backs facing each other, and polarizing sheet 150*p* is laminated on each of first reflecting surface 311*p* and second reflecting surface 312*p*, polarizing sheet 150*p* being a polarizing sheet that does not directly reflect the outside light which has passed through polarizing plate 41.

With this, since holder 140p rotatably holds reflector 30p, it is easy to rotate reflector 30p. Here, reflector 30p includes first reflecting surface 311p and second reflecting surface 312p whose backs face each other. As such, by rotating reflector 30p, it is possible to cause first reflecting surface 311p or second reflecting surface 312p to face a person riding in conveyance 1. Also, polarizing sheet 150p that does not directly reflect outside light that has passed through polarizing plate 41 is laminated on each of first reflecting surface 311p and second reflecting surface 312p. With such polarizing sheet 150p, it is possible to prevent a reflecting surface (first reflecting surface 311p or second reflecting surface 312p) that faces windshield 2 from reflecting the outside light to outside of conveyance 1.

In display system 10p according to Embodiment 17, reflector 30p and outputter 20 are disposed in line in the front-back direction.

With this, since rotatable reflector 30p and outputter 20 are disposed is line in the front-back direction, it is possible to cause image light from outputter 20 and a reflected image of the rear of the conveyance to travel toward a person riding in the conveyance, simply by rotating reflector 30p.

Embodiment 18

FIG. 23 is a schematic diagram of display system 10q according to Embodiment 18. FIG. 23 shows display system 10q viewed from the left-hand side in the left-right direction of conveyance 1. Note that FIG. 23 shows a cross-sectional view of windshield 2 of conveyance 1 and ceiling 3 of conveyance 1.

As shown in FIG. 23, display system 10q is different from display system 10 mainly in that display system 10q includes optics 40q instead of optics 40 and that display system 10q includes supporter 160q that supports optics 40q. The following mainly describes the differences from display system 10.

Supporter 160q is a plate body that is light-transmissive and provided between windshield 2 and reflector 30. The upper edge portion of supporter 160q is located above the upper edge portion of reflector 30 and the lower edge portion of supporter 160q is located below the lower edge portion of reflector 30. Optics 40q (polarizing plate 41q) is laminated on the entirety of a surface of supporter 160q that is the surface facing reflector 30. Note that optics 40q may be laminated on a surface of supporter 160q that is the surface facing windshield 2. In the present embodiment, no optics is laminated on windshield 2. As described above, the absence of optics on windshield 2 simplifies the operation of setting optics.

As described above, in display system 10p according to Embodiment 17, optics 40q is supported by supporter 160q that is light-transmissive and provided between windshield 2 and reflector 30.

With this, supporter 160q that is light-transmissive and provided between windshield 2 and reflector 30 supports optics 40q. This enables optics 40q to be disposed closer to outputter 20 than windshield 2. Stated differently, it is possible for optics 40q to block image light before such image light arrives at windshield 2. When the lower edge position of the optics provided on windshield 2 is the same as that of optics 40q provided in supporter 160q, for example, optics 40q provided in supporter 160q is capable of blocking light across a wider area.

Other Embodiment

The display system according to one or more aspects of the present disclosure has been described above on the basis of the embodiments, but the present disclosure is not limited to such embodiments. The scope of one or more aspects of the present disclosure may also include an embodiment achieved by making various modifications to the embodiments that can be conceived by those skilled in the art and an embodiment achieved by combining some of the elements of different embodiments, without departing from the essence of the present disclosure.

APPENDIX

From the foregoing descriptions of the embodiments, and so forth, the technologies to be described below are disclosed.

(Technology 1)
A display system including:
an outputter that is provided behind a windshield of a conveyance in a front-back direction of the conveyance and includes an output surface from which image light is outputted toward the windshield;
a reflector that is provided between the windshield and the output surface and includes a reflecting surface at which the image light outputted from the output surface is reflected; and
optics that includes a polarizing plate and is provided on the windshield or between the windshield and the reflector, the polarizing plate absorbing or reflecting the image light outputted from the output surface and not reflected at the reflecting surface, and allowing outside light that is light outside of the conveyance to pass through the polarizing plate.

(Technology 2)
The display system according to technology 1,
wherein the polarizing plate is provided at least one of: above a line that passes through an upper edge portion of the output surface and an upper edge portion of the reflector in an up-down direction of the conveyance; or below a line that passes through a lower edge portion of the output surface and a lower edge portion of the reflector in the up-down direction of the conveyance.

(Technology 3)
The display system according to technology 1 or 2,
wherein the optics includes a λ/4 plate that is provided on a side of the polarizing plate that is opposite to a side facing the reflector.

(Technology 4)
The display system according to any one of technologies 1 to 3, including:
a correction lens that is provided between the output surface and the reflecting surface, allows the image light outputted from the output surface to pass through the correction lens toward the reflecting surface, and corrects an image formed of the image light reflected at the reflecting surface.

(Technology 5)
The display system according to any one of technologies 1 to 3, including:
an imager that images a person riding in the conveyance;
a correction lens that is provided between the output surface and the reflecting surface and allows the image light outputted from the output surface to pass through the correction lens toward the reflecting surface, the correction lens being a correction lens for correcting an image formed of the image light reflected at the reflecting surface; and a corrector that corrects the image formed of the image light reflected at the reflecting surface by controlling a position of the correction lens, based on at least one of a position of a head of the person or a position of an eye of the person, the person having been imaged by the imager.

(Technology 6)

The display system according to any one of technologies 1 to 3, including:

an imager that images a person riding in the conveyance; and a corrector that corrects an image formed of the image light reflected at the reflecting surface by correcting an image signal that is a base of the image signal, based on at least one of a position of a head of the person or a position of an eye of the person, the person having been imaged by the imager.

(Technology 7)

The display system according to any one of technologies 1 to 6, wherein in a left-right direction of the conveyance, the output surface and the reflecting surface are provided on a driver's seat side of the conveyance relative to a center of the conveyance.

(Technology 8)

The display system according to any one of technologies 1 to 7, wherein when viewed from an up-down direction of the conveyance, the output surface and the reflecting surface are provided in an orientation in which a line that passes through a center of the output surface and a center of the reflecting surface passes through a head of a person riding in the conveyance.

(Technology 9)

The display system according to any one of technologies 1 to 8, wherein the polarizing plate is not provided in at least part of a portion of the windshield, the portion being a portion that overlaps the reflector in a direction in which the output surface and the reflecting surface are disposed in line.

(Technology 10)

The display system according to any one of technologies 1 to 9, including:

a louver film that is provided between the output surface and the reflecting surface, allows the image light outputted in a direction from the output surface to the reflecting surface to pass through the louver film, and blocks the image light that is outputted more downward than the direction from the output surface to the reflecting surface in an up-down direction of the conveyance.

(Technology 11)

The display system according to any one of technologies 1 to 9, including:

a blocker that blocks the image light that is outputted more downward than a direction from the output surface to the reflecting surface in an up-down direction of the conveyance.

(Technology 12)

The display system according to any one of technologies 1 to 11, including:

a $\lambda/4$ plate that is provided between the output surface and the reflecting surface, wherein the optics includes a $\lambda/4$ plate that is provided on a side of the polarizing plate that is a side facing the reflector.

(Technology 13)

The display system according to any one of technologies 1 to 12, wherein the polarizing plate is a reflective polarizing plate that reflects the image light outputted from the output surface and not reflected at the reflecting surface.

(Technology 14)

The display system according to any one of technologies 1 to 13, wherein the reflecting surface is a concave curved surface, and the output surface is provided in parallel with a tangent line that passes through a center of the reflecting surface.

(Technology 15)

The display system according to any one of technologies 1 to 13, wherein the reflecting surface is a concave curved surface and provided in an orientation in which a tangent line that passes through a center of the reflecting surface is inclined with respect to an up-down direction of the conveyance, and the output surface is provided in an orientation in which the output surface is more inclined than the tangent line with respect to the up-down direction of the conveyance.

(Technology 16)

The display system according to any one of technologies 1 to 12, wherein the polarizing plate is a reflective polarizing plate that reflects the image light outputted from the output surface and not reflected at the reflecting surface, the reflecting surface is a concave curved surface and provided in an orientation in which a tangent line that passes through a center of the reflecting surface is inclined with respect to an up-down direction of the conveyance, and the windshield is provided in an orientation in which the windshield is more inclined than the tangent line with respect to the up-down direction of the conveyance.

(Technology 17)

The display system according to any one of technologies 1 to 12, including:

a holder that rotatably holds the reflector, wherein the reflecting surface includes a first reflecting surface and a second reflecting surface that are located with respective backs facing each other, and a polarizing sheet is laminated on each of the first reflecting surface and the second reflecting surface, the polarizing sheet being a polarizing sheet that does not directly reflect the outside light which has passed through the polarizing plate.

(Technology 18)

The display system according to technology 17, wherein the reflector and the outputter are disposed in line in the front-back direction.

(Technology 19)

The display system according to any one of technologies 1 to 18,
wherein the optics is supported by a supporter that is light-transmissive and provided between the windshield and the reflector.

(Technology 20)

The display system according to any one of technologies 1 to 19,
wherein an absorptivity of the image light or a transmissivity of the outside light in the optics have a gradient in an up-down direction of the optics.

(Technology 21)

The display system according to any one of technologies 1 to 20,
wherein the optics is provided on the windshield.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2022-141246 filed on Sep. 6, 2022, and Japanese Patent Application No. 2023-032534 filed on Mar. 3, 2023.

INDUSTRIAL APPLICABILITY

The present disclosure is applicable for use as, for example, a display system that displays an image.

The invention claimed is:

1. A display system comprising:
an outputter that is provided behind a windshield of a conveyance in a front-back direction of the conveyance and includes an output surface from which image light is outputted toward the windshield;
a reflector that is provided between the windshield and the output surface and includes a reflecting surface at which the image light outputted from the output surface is reflected; and
optics that includes a polarizing plate and is provided on the windshield or between the windshield and the reflector, the polarizing plate absorbing or reflecting the image light outputted from the output surface and not reflected at the reflecting surface, and allowing outside light that is light outside of the conveyance to pass through the polarizing plate.

2. The display system according to claim 1,
wherein the polarizing plate is provided at least one of:
above a line that passes through an upper edge portion of the output surface and an upper edge portion of the reflector in an up-down direction of the conveyance; or
below a line that passes through a lower edge portion of the output surface and a lower edge portion of the reflector in the up-down direction of the conveyance.

3. The display system according to claim 1,
wherein the optics includes a λ/4 plate that is provided on a side of the polarizing plate that is opposite to a side facing the reflector.

4. The display system according to claim 1, comprising:
a correction lens that is provided between the output surface and the reflecting surface, allows the image light outputted from the output surface to pass through the correction lens toward the reflecting surface, and corrects an image formed of the image light reflected at the reflecting surface.

5. The display system according to claim 1, comprising:
an imager that images a person riding in the conveyance;
a correction lens that is provided between the output surface and the reflecting surface and allows the image light outputted from the output surface to pass through the correction lens toward the reflecting surface, the correction lens being a correction lens for correcting an image formed of the image light reflected at the reflecting surface; and
a corrector that corrects the image formed of the image light reflected at the reflecting surface by controlling a position of the correction lens, based on at least one of a position of a head of the person or a position of an eye of the person, the person having been imaged by the imager.

6. The display system according to claim 1, comprising:
an imager that images a person riding in the conveyance; and
a corrector that corrects an image formed of the image light reflected at the reflecting surface by correcting an image signal that is a base of the image signal, based on at least one of a position of a head of the person or a position of an eye of the person, the person having been imaged by the imager.

7. The display system according to claim 1,
wherein in a left-right direction of the conveyance, the output surface and the reflecting surface are provided on a driver's seat side of the conveyance relative to a center of the conveyance.

8. The display system according to claim 1,
wherein when viewed from an up-down direction of the conveyance, the output surface and the reflecting surface are provided in an orientation in which a line that passes through a center of the output surface and a center of the reflecting surface passes through a head of a person riding in the conveyance.

9. The display system according to claim 1,
wherein the polarizing plate is not provided in at least part of a portion of the windshield, the portion being a portion that overlaps the reflector in a direction in which the output surface and the reflecting surface are disposed in line.

10. The display system according to claim 1, comprising:
a louver film that is provided between the output surface and the reflecting surface, allows the image light outputted in a direction from the output surface to the reflecting surface to pass through the louver film, and blocks the image light that is outputted more downward than the direction from the output surface to the reflecting surface in an up-down direction of the conveyance.

11. The display system according to claim 1, comprising:
a blocker that blocks the image light that is outputted more downward than a direction from the output surface to the reflecting surface in an up-down direction of the conveyance.

12. The display system according to claim 1, comprising:
a λ/4 plate that is provided between the output surface and the reflecting surface,
wherein the optics includes a λ/4 plate that is provided on a side of the polarizing plate that is a side facing the reflector.

13. The display system according to claim 1,
wherein the polarizing plate is a reflective polarizing plate that reflects the image light outputted from the output surface and not reflected at the reflecting surface.

14. The display system according to claim 1,
wherein the reflecting surface is a concave curved surface, and
the output surface is provided in parallel with a tangent line that passes through a center of the reflecting surface.

15. The display system according to claim 1,
wherein the reflecting surface is a concave curved surface and provided in an orientation in which a tangent line that passes through a center of the reflecting surface is inclined with respect to an up-down direction of the conveyance, and
the output surface is provided in an orientation in which the output surface is more inclined than the tangent line with respect to the up-down direction of the conveyance.

16. The display system according to claim 1,
wherein the polarizing plate is a reflective polarizing plate that reflects the image light outputted from the output surface and not reflected at the reflecting surface,
the reflecting surface is a concave curved surface and provided in an orientation in which a tangent line that passes through a center of the reflecting surface is inclined with respect to an up-down direction of the conveyance, and
the windshield is provided in an orientation in which the windshield is more inclined than the tangent line with respect to the up-down direction of the conveyance.

17. The display system according to claim 1, comprising:
a holder that rotatably holds the reflector,
wherein the reflecting surface includes a first reflecting surface and a second reflecting surface that are located with respective backs facing each other, and
a polarizing sheet is laminated on each of the first reflecting surface and the second reflecting surface, the polarizing sheet being a polarizing sheet that does not directly reflect the outside light which has passed through the polarizing plate.

18. The display system according to claim 1,
wherein the optics is supported by a supporter that is light-transmissive and provided between the windshield and the reflector.

19. The display system according to claim 1,
wherein an absorptivity of the image light or a transmissivity of the outside light in the optics have a gradient in an up-down direction of the optics.

20. The display system according to claim 1,
wherein the optics is provided on the windshield.

* * * * *